(12) United States Patent
Takahashi et al.

(10) Patent No.: US 9,273,886 B2
(45) Date of Patent: Mar. 1, 2016

(54) MAGNETIC REFRIGERATOR UTILIZING A PERMANENT MAGNET TO CREATE MOVEMENT BETWEEN PLATES COMPRISING HIGH AND LOW TEMPERATURE SIDE HEAT EXCHANGERS

(75) Inventors: Hidekazu Takahashi, Yokohama (JP); Yutaka Tasaki, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 175 days.

(21) Appl. No.: 14/115,153

(22) PCT Filed: Apr. 23, 2012

(86) PCT No.: PCT/JP2012/060860
§ 371 (c)(1),
(2), (4) Date: Dec. 2, 2013

(87) PCT Pub. No.: WO2012/150681
PCT Pub. Date: Nov. 8, 2012

(65) Prior Publication Data
US 2014/0075958 A1 Mar. 20, 2014

(30) Foreign Application Priority Data

May 2, 2011 (JP) ................................. 2011-103296

(51) Int. Cl.
*F25B 21/00* (2006.01)
(52) U.S. Cl.
CPC ......... *F25B 21/00* (2013.01); *F25B 2321/0022* (2013.01); *Y02B 30/66* (2013.01)
(58) Field of Classification Search
CPC .......................... F25B 2321/0022; F25B 21/00

USPC .......................................................... 62/3.1, 6
See application file for complete search history.

(56) References Cited

U.S. PATENT DOCUMENTS

| 6,460,348 | B2 * | 10/2002 | Okamura .................. F25B 9/14 62/6 |
| 6,668,560 | B2 * | 12/2003 | Zimm et al. ...................... 62/3.1 |
| 6,935,121 | B2 * | 8/2005 | Fang et al. ........................ 62/3.1 |

(Continued)

FOREIGN PATENT DOCUMENTS

| JP | 2006308197 A | 11/2006 |
| JP | 2007147209 A | 6/2007 |

(Continued)

OTHER PUBLICATIONS

Communication with extended European search report dated Jan. 27, 2015 from the corresponding European Application 12779782.7.

*Primary Examiner* — Allen Flanigan
*Assistant Examiner* — Filip Zec
(74) *Attorney, Agent, or Firm* — Young Basile

(57) ABSTRACT

A magnetic body is provided to improve heat transport capability and heat transport efficiency. A magnetic body arranged plate has magnetic body units each including magnetic members. Low-temperature side and high-temperature side heat exchange units are disposed at ends of each magnetic body unit. Permanent magnets and heat conductive members are arranged on a magnet/heat conductive member arranged plate. When the magnetic body arranged plate and the magnet/heat conductive member arranged plate are moved relative to each other, the permanent magnets apply magnetism separately to the magnetic members of each magnetic body unit. The magnet/heat conductive member arranged plate creates a temperature difference and conducts heat in one direction between the magnetic members, the low-temperature side heat exchange unit, and the high-temperature side heat exchange unit.

10 Claims, 14 Drawing Sheets

(56) References Cited

U.S. PATENT DOCUMENTS

| | | |
|---|---|---|
| 7,552,592 B2 | 6/2009 | Iwasaki et al. |
| 8,448,453 B2 * | 5/2013 | Bahl et al. .................. 62/3.1 |
| 8,646,280 B2 * | 2/2014 | Chang et al. ................ 62/3.1 |
| 2007/0125094 A1 | 6/2007 | Iwasaki et al. |
| 2010/0071383 A1 * | 3/2010 | Zhang et al. ................ 62/3.1 |
| 2011/0041514 A1 * | 2/2011 | Heitzler et al. ............. 62/3.1 |
| 2011/0067415 A1 | 3/2011 | Mao et al. |

FOREIGN PATENT DOCUMENTS

| | | |
|---|---|---|
| JP | 2010043775 A | 2/2010 |
| JP | 2010112606 A | 5/2010 |

* cited by examiner

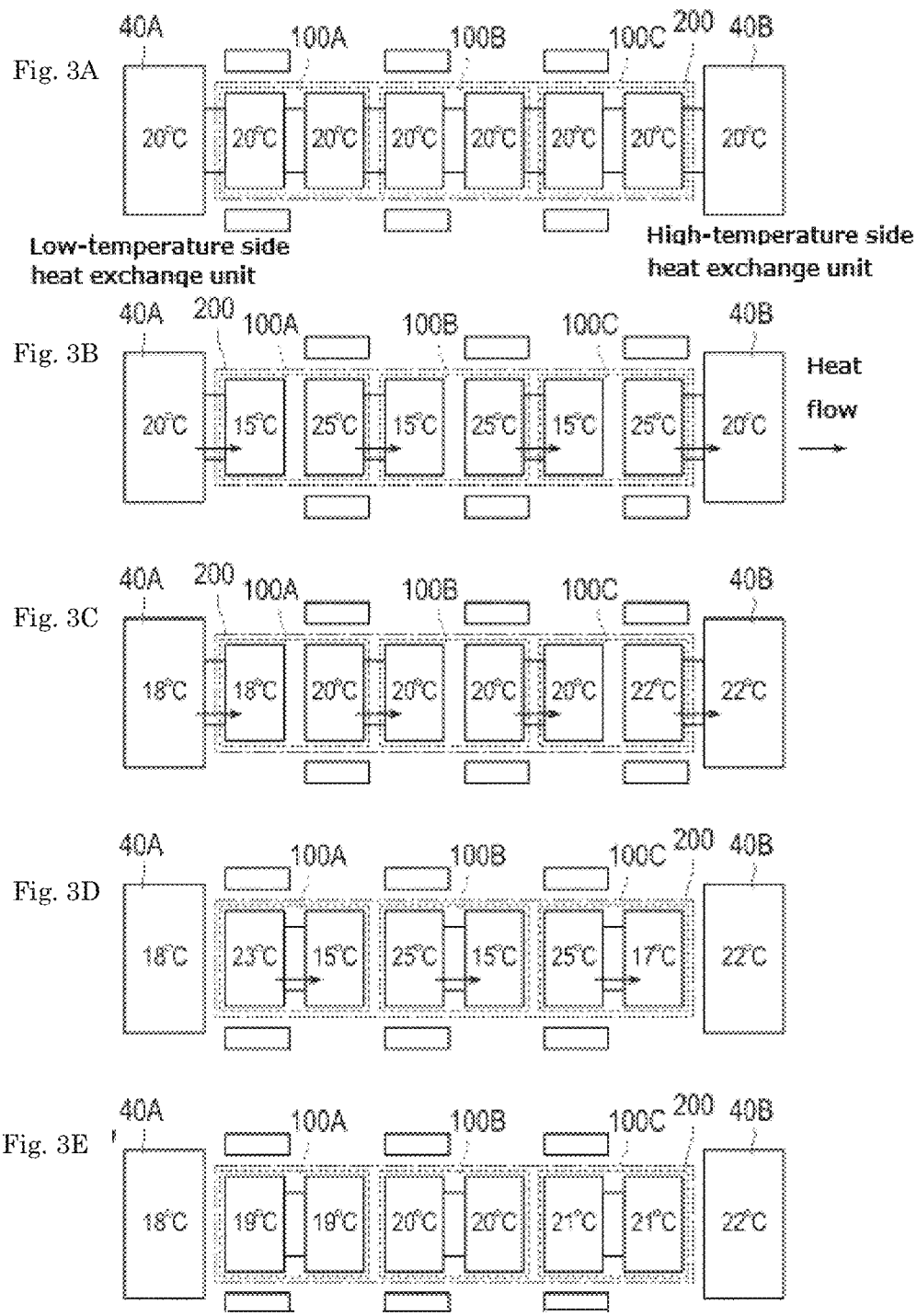

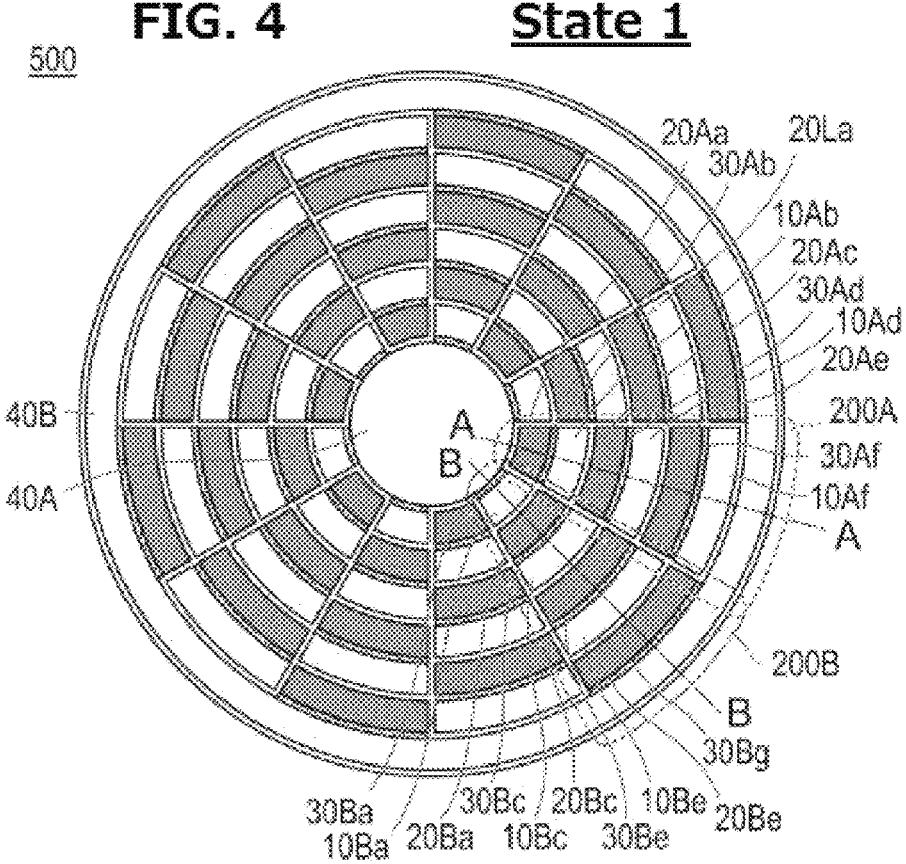

MAGNETIC REFRIGERATOR UTILIZING A PERMANENT MAGNET TO CREATE MOVEMENT BETWEEN PLATES COMPRISING HIGH AND LOW TEMPERATURE SIDE HEAT EXCHANGERS

CROSS-REFERENCE TO RELATED APPLICATIONS

This national stage application claims priority to Japanese Patent Application No. 2011-103296 filed on May 2, 2011, which is incorporated herein in its entirety.

TECHNICAL FIELD

The present invention relates to a magnetic refrigerator, and especially relates to a magnetic refrigerator that transports heat of multiple magnetic bodies through heat conduction of the solid material by separately applying magnetism to the multiple magnetic bodies of the same material to thereby exhibit a magnetocaloric effect.

BACKGROUND

Conventionally, the majority of the heating and cooling or air conditioning devices operating in room temperature range such as refrigerators, freezers, and air conditioners take advantage of the thermal conductivity of a gas refrigerant like chlorofluorocarbon (CFC) gas and its alternatives. More recently, the problem of ozone depletion caused by the discharge of Freon™ gas, and further, the effects of global warming due to discharge of alternative Freon™ have been realized. Therefore, the development of the air conditioning device is strongly desired, which is clean and innovative with high heat transfer capacity as an alternative to the refrigerator using the gaseous refrigerant and causing the high environmental loads due to use of CFC or its alternatives.

Against this background, air conditioning technology that is attracting attention recently is a magnetic heating and cooling technology. Some of the magnetic material, when the magnitude of the magnetic field applied to the magnetic body is changed, varies its own temperature in response to that change, through so-called magnetocaloric effect. The magnetic conditioning device technology is directed to such technology for transporting heat by using a magnetic material expressing the magneto-caloric effect.

For a refrigerator utilizing the magnetic refrigeration technique, for example, a magnetic refrigerator such as that described in Japanese Patent Application No. JP-A No. 2007-147209 transports heat by using heat conduction of solid material. This magnetic refrigerator causes to conduct heat by the configuration described below.

A positive magnetic member that increases in temperature when applied with magnetism or magnetic field and a negative magnetic member that decreases in temperature when applied with magnetism are alternately arranged at predetermined intervals. A pair of the positive and the negative magnetic members constitute a magnetic member block. A magnetic member unit is formed by arranging a plurality of the magnetic blocks annually. A heat conducting member for selectively inserting into or removing from between the positive and negative magnetic members arranged on the magnetic member unit is disposed between the positive and negative magnetic members. A magnetic circuit is formed by arranging permanent magnets disposed on a hub-shaped rotating member which is concentric with and has substantially the same inner and outer diameters as this magnetic member unit. Further, the rotating member on which permanent magnets are disposed is disposed so as to face the magnetic members and is caused to rotate relative to the magnetic member unit. By this rotation of the rotating member, the positive magnetic member and the negative magnetic member are simultaneously applied with magnetism and the magnetism is then removed. The heat conducting member is selectively inserted into or removed from between the positive and negative magnetic members at predetermined timing in accordance with the rotation of the rotating member. Consequently, the heat generated by the magnetic members through the magnetocaloric effect is transported via the heat conducting member in a direction of the arranged magnetic members. However, in this case, it is necessary to use two different, i.e. positive and negative magnetic members.

In general, the magnitude of the magnetocaloric effect of the positive magnetic member and that of the negative magnetic member are different from each other. Specifically, the magnetocaloric effect of the negative magnetic material is small compared to the magnetocaloric effect of the positive magnetic material. Therefore, in the case of a magnetic refrigerator using a magnetic body of two different, positive and negative members, since it is impossible to obtain a uniform magnetocaloric effect, thus the heat transfer efficiency of the magnetic refrigerator overall is poor. It is possible to increase the heat transfer efficiency when a uniform magnetocaloric effect is obtained. Thus, there is room for improvement in this respect. Further, the material of the negative magnetic material is relatively of rare materials as compared to the material of the positive magnetic material, the magnetic refrigerator becomes more expensive.

Furthermore, since the magnetic circuit applying or removing a magnetic field simultaneously the two, i.e. positive and negative materials is large, a large and heavy magnetic refrigerator is the result. If the weight of the magnetic circuit can be smaller, it is possible to reduce the size of the magnetic refrigerator and to lower the cost and weight. In this regard, there is further room for improvement.

BRIEF SUMMARY

The present invention has been created in order to solve the various problems described above. The thermal transport capability and thermal transport efficiency are improved. Further, the present invention is intended to provide a magnetic refrigerator capable of realizing miniaturization, weight reduction, and cost reduction.

The magnetic refrigerator according to the present invention to achieve the objective described above is provided with a magnetic body disposed or arranged plate, a low-temperature side heat exchange portion, a high-temperature side heat exchange portion, a magnet/heat conduction unit, and a driving unit.

On the magnetic body arranged plate, a plurality of magnetic members of the same material are disposed in row with a space or gap there between to form a magnetic body unit, and a plurality of the magnetic body units are disposed side by side with a space or gap there between in a direction crossing the direction along which the magnetic members are disposed. At one end of each magnetic body unit is disposed a low-temperature heat exchange unit while at the other end is disposed a high-temperature heat exchange unit, respectively.

On the magnet/thermal conductive member, a plurality of magnetism applying parts and heat conducting members are disposed to face the magnetic body arranged plate.

To the magnet/heat conductive member is arranged a magnetism applying unit that is configured to apply magnetism separately on the magnetic members of each magnetic body unit disposed on the magnetic body arranged plate. In addition, a heat conductive member is disposed to conduct the heat generated at each magnetic body unit from the low-temperature side heat exchange unit to the high-temperature side heat exchange unit.

The driving unit is configured to drive at least one of the magnetic body arranged plate and the magnet/heat conductive member arranged plate so as to move the magnetic body arranged plate relative to the magnet/heat conductive member arranged plate in the arranged direction of the magnetic body units.

When the magnetic body arranged plate is relatively moved to the magnet/heat conductive member arranged plate in the arrangement direction of the magnetic body unit by the driving unit, the heat generated by each magnetic body unit is transported from the low-temperature side heat exchange unit to the high temperature heat exchange unit.

According to the magnetic refrigerator according to the present invention configured as described above, since, by exhibiting the magnetocaloric effect by applying a magnetic individually to a plurality of magnetic members of the same material, heat of the plurality of magnetic members is transported by taking advantage of heat conductively of the solid material, the heat transport capability and the heat transport efficiency are increased and a refrigerator of smaller, lighter, lower cost can be realized.

BRIEF DESCRIPTION OF THE DRAWINGS

The description herein makes reference to the accompanying drawings wherein like reference numerals refer to like parts throughout the several views, and wherein:

FIG. 1A is one state and FIG. 1B is another state, the states reciprocally alternating;

FIGS. 3A-3E together are a principle diagram for explaining how heat moves in a first embodiment, with FIGS. 3A-3E each illustrating a phase of the change in heat;

FIG. 4 is a top view showing a schematic configuration of a magnetic refrigerator according to the first embodiment;

DETAILED DESCRIPTION

In the following, description is made of embodiments of the magnetic refrigerator according to the present invention. First, the principle of magnetic refrigeration applied to the present invention is now described in detail with respect to FIGS. 1A and 1B. With respect to the magnetic members 10A-10F, positive magnetic members are used as the magnetic members of the same and identical material and thus exhibit the same type of magnetocaloric effect.

A magnetic body block 100A is formed by the magnetic members 10A, 10B, a magnetic body block 100B by the magnetic members 10C, 10D, and a magnetic body block 100C is formed by the magnetic members 10E, 10F. Further, a magnetic body unit 200 is formed by the magnetic body blocks 100A to 100C.

Figure 1A:
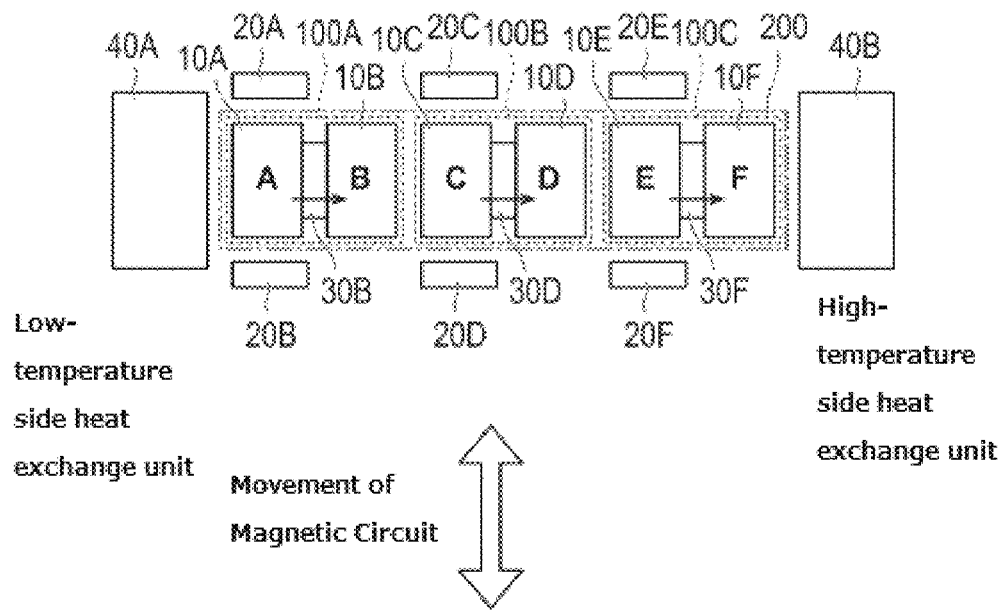
FIGS. 1A and 1B together are a principle diagram of a magnetic refrigeration applicable to the present invention, where
Figure 1B:
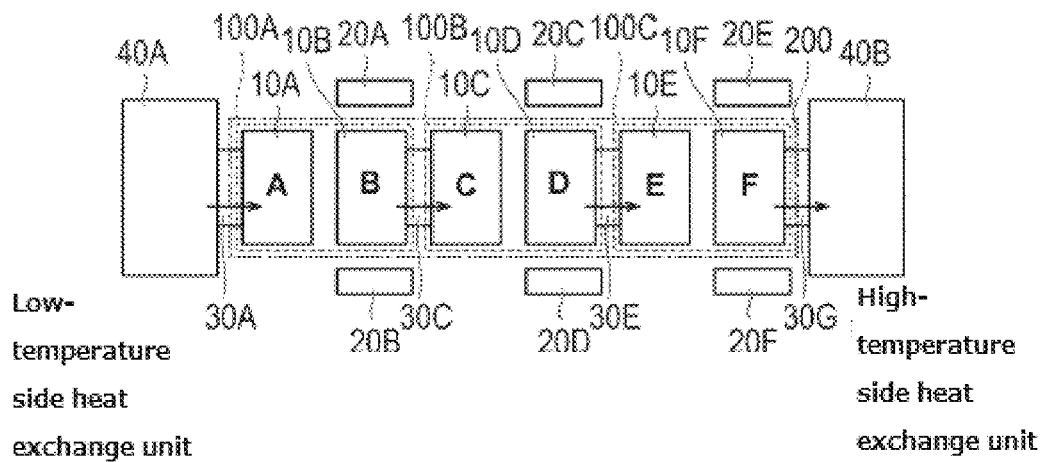

A magnetic circuit 20A, 20B, a magnetic circuit 20C, 20D, and magnetic circuit 20E, 20F are reciprocal between the magnetic members 10A-10F. In other words, the state in FIG. 1A transfers to FIG. 1B when the magnetic circuit 20A, 20B moves from the magnetic member 10A to 10B, the magnetic circuit 20C, 20D from the magnetic member 10C to 10D, and the magnetic circuit 20E, 20F from the magnetic member 10E to 10F, simultaneously. The state in FIG. 1B returns to the state in FIG. 1A when the magnetic circuit 20A, 20B moves from the magnetic member 10B to 10A, the magnetic circuits 20C, 20D from the magnetic member 10D to 10C, and the magnetic circuit 20E, 20F from the magnetic member 10F to 10E, at the same time. Therefore, by the reciprocal movement of the magnetic circuit, the states in FIG. 1A and FIG. 1B are repeated alternately.

Here, a plurality of the magnetic members 10A-10F are composed by using only either the positive magnetic members which generate heat when applied with magnetism by the magnetic circuits 20A, 20B to the magnetic circuit 20E, 20F and absorb heat with the magnetism removed, or the negative magnetic members which absorb energy when applied with magnetism and generate heat at removal of the magnetism. The magnetocaloric effects are opposite from each other between the positive magnetic body and the negative magnetic body so that the type of magnetocaloric effects are different. For the case illustrated in FIGS. 1A and 1B, the positive magnetic body is used which is inexpensive compared to a negative magnetic body. The negative magnetic body must be manufactured from a rare magnetic material and is costly. Further, the magnitude of the magnetocaloric effect of the negative magnetic material is smaller than the magnitude of the magnetocaloric effect of the positive magnetic material.

The magnetic circuits 20A, 20B-20E, and 20F are provided with permanent magnets (not shown). With each of magnetic circuits 20A, 20B, 20C, 20D, and 20E, 20F united to reciprocate in the lateral direction of the drawing, a magnetic will be applied separately or individually to the magnetic members 10A-10F.

The heat conducting members 30A-30G conduct the heat generated by the magnetic members 10A-10F through magnetocaloric effect from the low-temperature side heat exchange unit 40A toward the high-temperature side heat exchange unit 40B. The heat conductive member 30A is configured to selectively insert into or remove from between the low-temperature side heat exchange unit 40A and the adjacent magnetic member 10A to establish mechanical connection there between. The heat conductive member 30B is configured to selectively insert into and remove from between magnetic members 10A, 10B to establish a mechanical connection. Similarly, the heat conductive members 30, 30D, 30E, and 30F are selectively inserted into or removed from between the magnetic members 10B and 10C, the magnetic members 10C and 10D, magnetic members 10D and 10E, and the magnetic members 10E and 10F to establish respective mechanical connection. The heat conductive member 300 is configured to be selectively inserted into and removed from between the magnetic member 10F and the high-temperature side heat exchange unit 40B to establish a mechanical contact there between. The heat conductive members 30B, 30D, and 30F are configured to be inserted or removed from between the magnetic members 10A and 10B, the magnetic members 10C and 10D, and the magnetic members 10E and 10F at the same timing to establish mechanical connection. Also, the heat conductive members 30A, 30C, 30E, and 30G are configured to insert and remove from between the low-temperature side heat exchange unit 40A and the magnetic member 10A, between the magnetic members 10B and 10C, between the magnetic members 10D and 10E, and between the magnetic member 10F and the high-temperature side heat exchange unit 40B at the same timing to establish a mechanical connection. The heat conductive members 30B, 30D, and 30F and the heat conductive members 30A, 30C, 30E, and 30G are inserted or removed by turns or alternately.

As shown in FIG. 1A, the magnetic circuit 20A, 20B is positioned at the magnetic member 10A of the magnetic body block 100A, the magnetic circuit 20C, 20D at the magnetic member 10C of the magnetic body block 100B, and the magnetic circuit 20E, 20F at the magnetic member 10E of the magnetic body block 100C, respectively. At this time, the magnetic members 10A, 10C, and 10E are applied with magnetism, while the magnetic members 10B, 10D, 10F are not applied with magnetism but removed. In this instance, the magnetic members 10A, 10C, and 10E generate heat. At the same time, the heat conductive member 30B is inserted between the magnetic member 10C and 10D, the heat conductive member 30D between the magnetic members 10C and 10D, and the heat conductive member 30F between the magnetic members 10E and 10F, respectively. Thus, heat conduction takes place between adjacent magnetic members in each magnetic body block. In other words, the heat generated by the magnetic members 10A, 10C and 10E through magnetocaloric effect is transported to the magnetic members 10B, 10D, and 10F, respectively. Further, at this instance, the heat conductive member 30A and 30G are not inserted between the low-temperature heat exchange unit 40A and the magnetic member 10A or between the high-temperature side heat exchange unit 40B and the magnetic member 10F. Moreover, the heat conductive members 30C and 30E for performing heat conduction between the magnetic body blocks are not inserted between the magnetic members 10B and 10C, or between the magnetic members 10D and 10E, either.

Next, as shown in FIG. 1B, the magnetic circuit 20A, 20B is positioned at the magnetic member 10B of the magnetic body block 100A, the magnetic circuit 20C, 20D at the magnetic member 10D of the magnetic block 100B, and the magnetic circuit 20E, 20F at the magnetic member 10F of the magnetic body block 100C, respectively. In this instance, the magnetic members 10B, 10D, and 10F are applied with magnetism while the magnetic members 10A, 10C, and 10E are not magnetized but free from magnetism. In this instance, the magnetic members 10B, 10D, and 10F generate heat. Further, the heat conductive member 30A is inserted between the low-temperature side heat exchange unit 40A and the magnetic member 10A, the heat conductive member 30C between the magnetic member 10B and 10C, the heat conductive member 30E between the magnetic members 10D and 10E, and the heat conductive member 30G between the magnetic members 10F and the high-temperature heat exchange unit 40B, respectively. Thus, between the low-temperature side heat exchange unit 40A, the high-temperature side heat exchange unit 40B and the magnetic members 10A, 10F each positioned at both ends of the magnetic body unit 200, heat conduction takes place. In other words, the magnetic members 10A, 10C, and 10E absorb heat through magnetocaloric effect while the electric members 10B, 10D, and 10F generate heat through magnetocaloric effect. Therefore, heat transports from the low-temperature side heat exchange unit 40A to the magnetic member 10A, from the magnetic member 10B to the magnetic member 10C, from the magnetic member 10D to the magnetic member 10E, and from the magnetic member 10F to the high-temperature side heat exchange unit 40B. Further at this time, the heat conductive members 30B, 30D, and 30F for performing heat conduction within the magnetic body block are not inserted between the magnetic members 10A and 10B, between magnetic member 10C and 10D, and between the magnetic members 10E and 10F.

As described above, by reciprocating the magnetic circuit provided in correspondence with each magnetic body block 100A-100C in the left-to-right direction in the figure, the magnetic members positioned at both ends of each magnetic body block 100A to 100C are alternated with magnetism application and magnetism removal. Further in association with the movement of the magnetic circuit, the heat conductive members 30A-30G are repeated to insert or retreat from the low-temperature side heat exchange unit 40A, magnetic members 10A-10F, and the high-temperature side heat exchange unit 40B.

Thus, the heat gained through magnetocaloric effect transfers from the low-temperature side heat exchange unit 30A to the high-temperature side heat exchange unit 40B.

Figure 2:
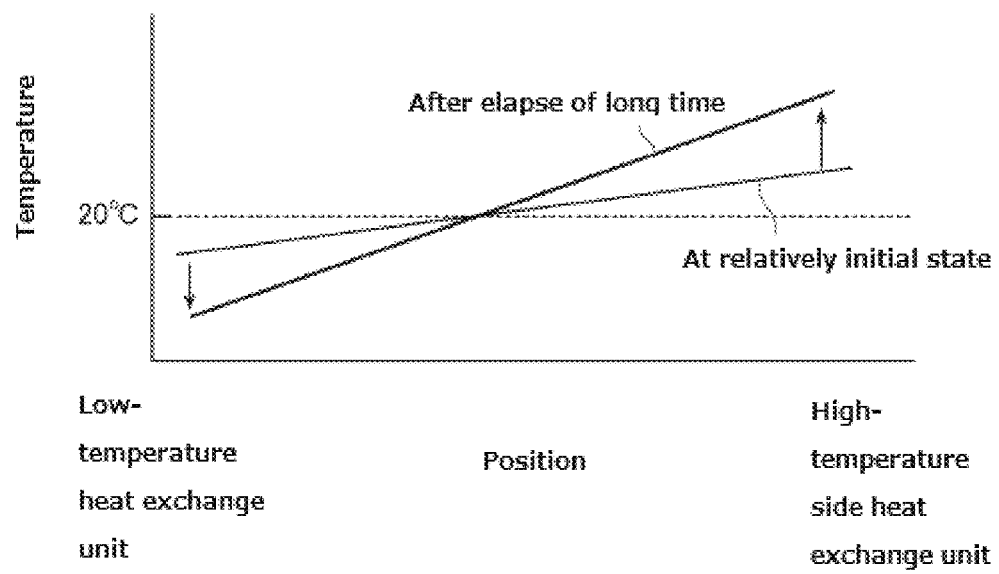
FIG. 2 is a graph showing the effect of magnetic refrigeration according to the present invention.

FIG. 2 is a graph showing the effect of magnetic refrigeration according to the present invention. As shown in this graph, in the initial stage shortly after the magnetic refrigerator has started the operation, the temperature difference between the low-temperature-side heat exchanger 40A and the high-temperature side heat exchange unit 40B is small. The temperature difference between the low temperature side heat exchange unit 40A and the high-temperature side heat exchanger 40B gradually increases as time elapses, and ultimately, as shown by straight line after long periods, the temperature difference between the low-temperature-side heat exchange unit 40A and the high-temperature side heat exchange unit 40B becomes maximum. In this state, by using the heat of the low-temperature side heat exchange unit 40A, for example, a room temperature can be decreased, while, by using the heat of the high-temperature side heat exchange unit 40B, the room temperature may be increased, for example.

Next, when the magnetic circuit provided in correspondence with each magnetic body block as shown in FIG. 1 is allowed to move reciprocally in the left-to-right direction in the figure, the situation in which heat transfers is described based on the schematic diagram of FIGS. 3A-3E.

As a prerequisite, all the magnetic members forming a magnetic body unit 200 are formed of the same material and the magnetocaloric effect of all the magnetic members are of the same type and it is assumed that, the temperature variation is 5° C. More specifically, it is assumed that all magnetic members have the characteristic according to which temperature rises by 5° C. when applied with magnetism and lowers by 5° C. when magnetic is removed.

First, as shown in FIG. 3A, the magnetic members are all at 20° C. room temperature in the initial state. Then, as shown in FIG. 3B, by moving the magnetic circuit from this state to the right, magnetism is removed from the magnetic members positioned at one end of each magnetic body block 100A-100C while applying magnetism to the magnetic members positioned on the other end. At the same time, the heat conductive member is inserted so as to enable heat conduction between the adjacent magnetic members of the adjacent magnetic blocks 100A to 100C, between the magnetic member positioned on one end of the magnetic body unit 200 and the low-temperature side heat exchange unit 40A, and between the magnetic member positioned on the other end of the magnetic body unit 200 and the high-temperature side heat exchange unit 40B.

In the state of FIG. 3B, the temperature of the magnetic member from which magnetism has been removed lowers to 15° C. while the temperature of the magnetic member to which magnetism is applied rises to 25° C. Therefore, as shown in the figure, the heat is moved to the lower temperature side from the higher temperature side via the heat conductive member.

Due to the movement of the heat, as shown in FIG. 3C, the temperature of the magnetic member positioned on the one end of the magnetic body unit 200 and the temperature of the low-temperature side heat exchange unit 40A assume 18° C. while the temperature of the magnetic member positioned on the other end of the magnetic body unit 200 and that of the high-temperature side heat exchange unit 40B will be 22° C.

Then, as shown in FIG. 3D, the magnetic circuit is moved in the left from this state and magnetism is removed from the magnetic members positioned on the other end of each magnetic body block 100A-100C, while applying magnetism to the magnetic members positioned on the one end. At the same time, the heat conductive member is inserted to enable heat conduction between the adjacent magnetic members in each magnetic block 100A-100C.

In the state of FIG. 3D, the temperature of the magnetic member to which magnetism has been applied rises by 5° C. from the temperature in the state of FIG. 3B, while the temperature of the magnetic member from which magnetism has been removed lowers by 5° C. from the state in FIG. 3C. Thus, as shown in figure, heat moves from the high temperature side to the low temperature side within each magnetic body block 100A-100C via the heat conductive member.

Due to the movement of the heat, as shown in FIG. 3E, the temperature of the low-temperature side heat exchange unit 40A becomes 18° C., while the temperature of the magnetic member of the magnetic block 100A becomes 19° C. In addition, the temperature of the magnetic block 100B becomes 20° C., whereas the temperature of the magnetic member of the magnetic block 100C becomes 21° C. The temperature of the high-temperature side heat exchange unit 40B will be 22° C.

As described above, by reciprocating the magnetic circuit from side to side along the magnetic members while selectively performing the insert/removal operation of the heat conductive member in synchronization with the movement of the magnetic circuit, heat moves from the low-temperature side heat exchange unit 40A to the high-temperature side heat exchange unit 40B. As time elapses, the temperature difference between the low-temperature side heat exchange unit 40A and the high-temperature side heat exchange unit 40B is gradually increased. Eventually, the temperature difference between the low-temperature side heat exchange unit 40A and the high-temperature side heat exchange unit 40B is constant. In this state, it is possible to lower the room temperature by using the heat of the low-temperature side heat exchange unit 40A while it is possible to utilize the heat of the high-temperature side heat exchange unit 40B to increase the temperature in the room.

The description of FIGS. 1A, 1B and 3A-3E holds true for the case in which a positive magnetic body is used as the magnetic body of the same material and of the same type of the exhibited magnetocaloric effect. When a negative magnetic material is used as the magnetic body of the same material and of the same type of the exhibited magnetocaloric effect, then the direction of heat movement will be opposite from that in FIGS. 3A-3E.

Therefore, when using the negative magnetic material, the positions of the low-temperature side heat exchange unit 40A and the high-temperature side heat exchange unit 40B will be opposite from FIGS. 1A, 1B and 3A-3E.

The above description is the principle of magnetic refrigeration to be applied to the present invention. In the description above, a magnetic body block is formed by two magnetic members, and a magnetic body unit is formed by arranging three of the magnetic body blocks. However, the present invention is not limited to these embodiments. That is, the present invention is also applicable to such a case in which, by arranging a more number of magnetic members, a magnetic body block is formed, and by arranging a more number of magnetic blocks, a magnetic body unit is formed.

Next, the description of the embodiments using the principle described above will be divided into three embodiments. In the magnetic refrigerator pertaining to the first embodiment, the magnetic member, the magnetic circuit and the heat conductive member are arranged annularly and radially, and the magnetic body is fixed with the magnetic circuit and the heat conductive member are rotated. In the magnetic refrigerator pertaining to the second embodiment, respective size of the magnetic member, the magnetic circuit and the heat conductive member are different from the first embodiment form the center of rotation to the outward direction. In the magnetic refrigerator pertaining to the third embodiment, the magnetic circuit and the heat conductive member pertaining to the second embodiment are now fixed and stationary while the magnetic body is rotatable.

The specific configuration and operation of the magnetic refrigerator according to the first embodiment which utilizes the principle as described above will be described with reference to FIGS. 4 to 8.

Figure 5A:
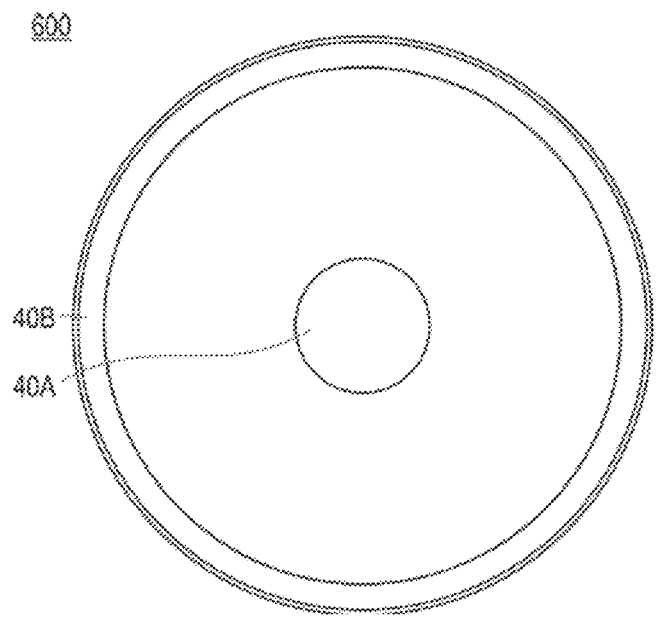
FIG. 5A is a top view of the heat exchange unit support plate constituting the magnetic refrigerator shown in FIG. 4.
Figure 5B:
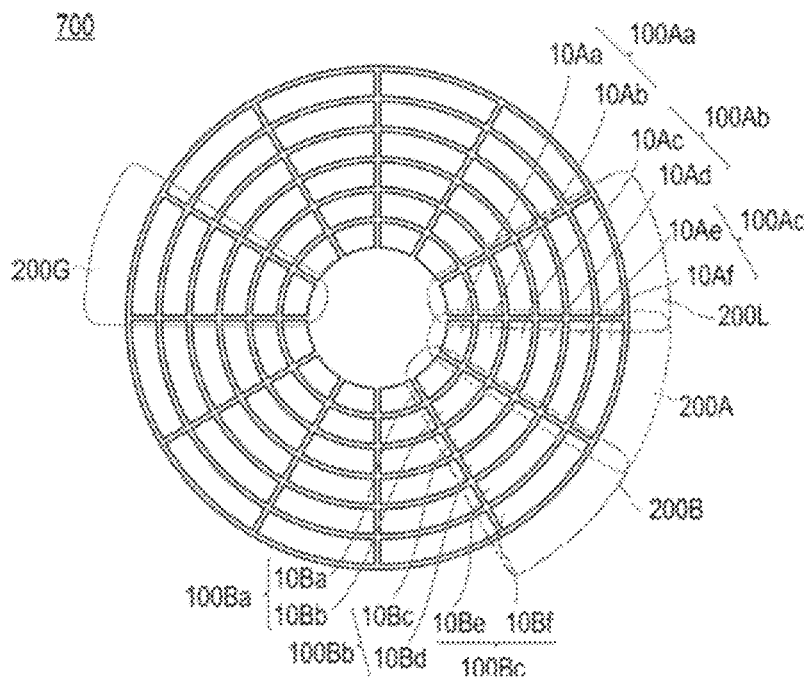
FIG. 5B is a top view of the magnetic member arranged plate constituting the magnetic refrigerator shown in FIG. 4.
Figure 5C:
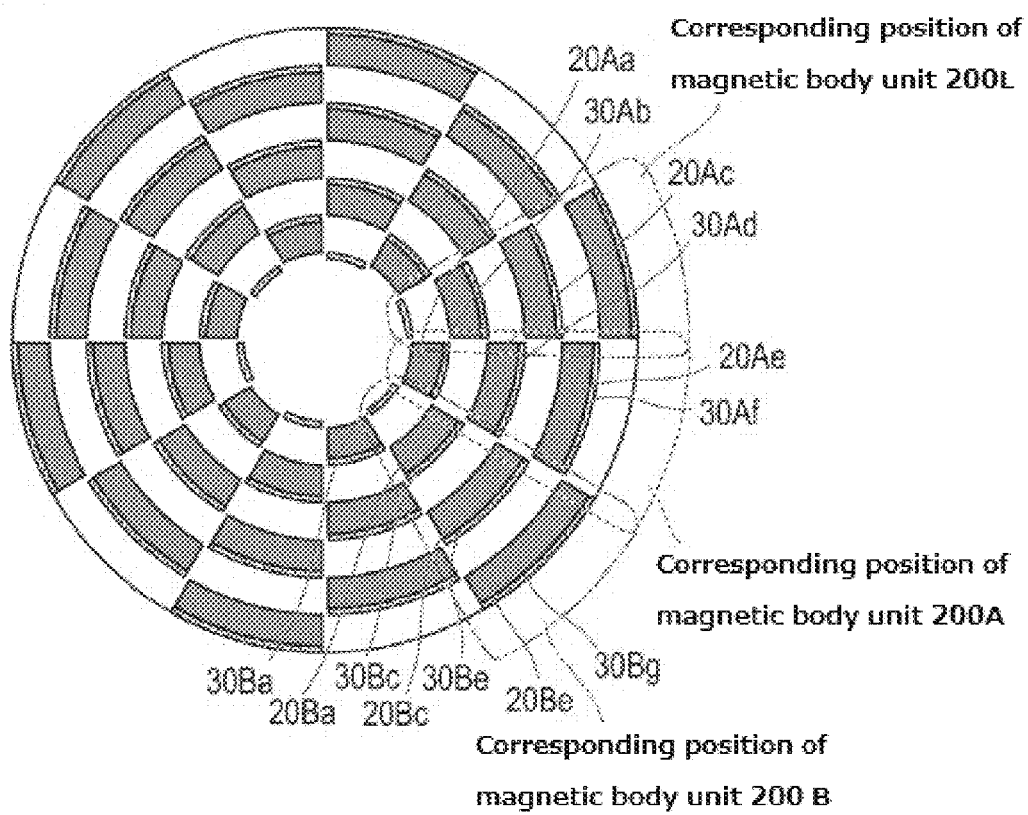
FIG. 5C is a top view of the magnet/heat conductive member arranged or disposed plate constituting the magnetic refrigerator shown in FIG. 4.
Figure 6:
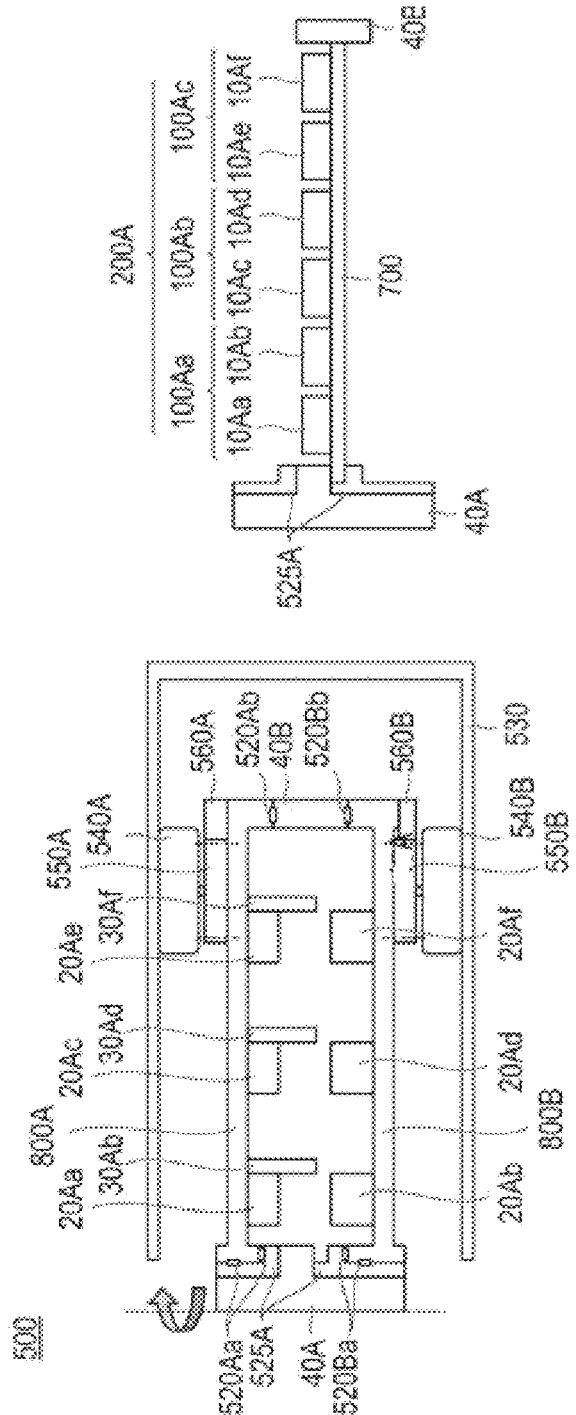
FIG. 6 is an exploded cross-sectional view of the magnetic refrigerator shown in FIG. 4.
Figure 7A:
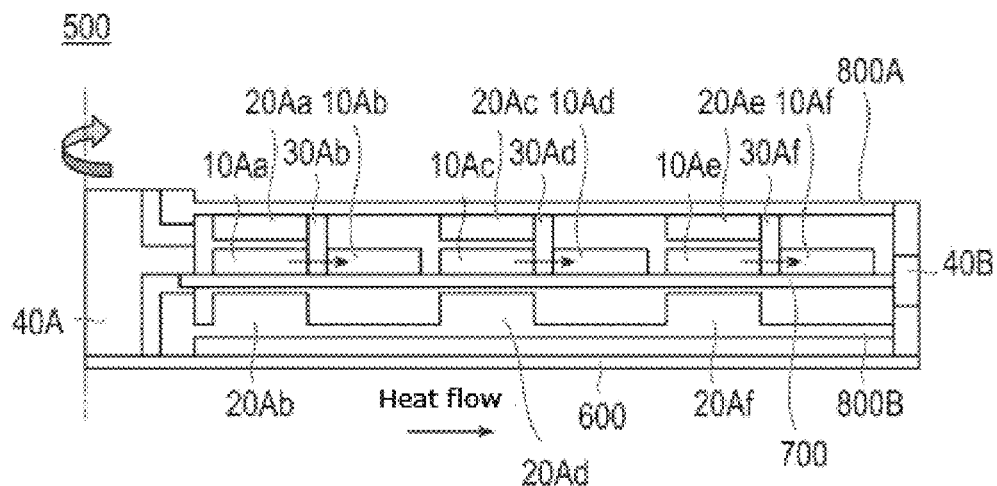
FIGS. 7A and 7B together are a schematic view for explaining a state in which heat moves when rotating the magnet/heat conductive member arranged or disposed plate of the magnetic refrigerator between FIG. 7A and FIG. 7B according to the first embodiment.
Figure 7B:
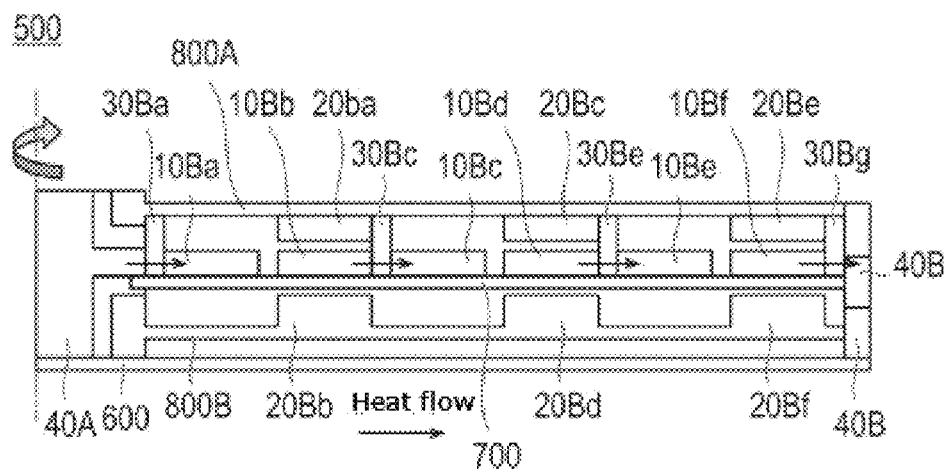
Figure 8:
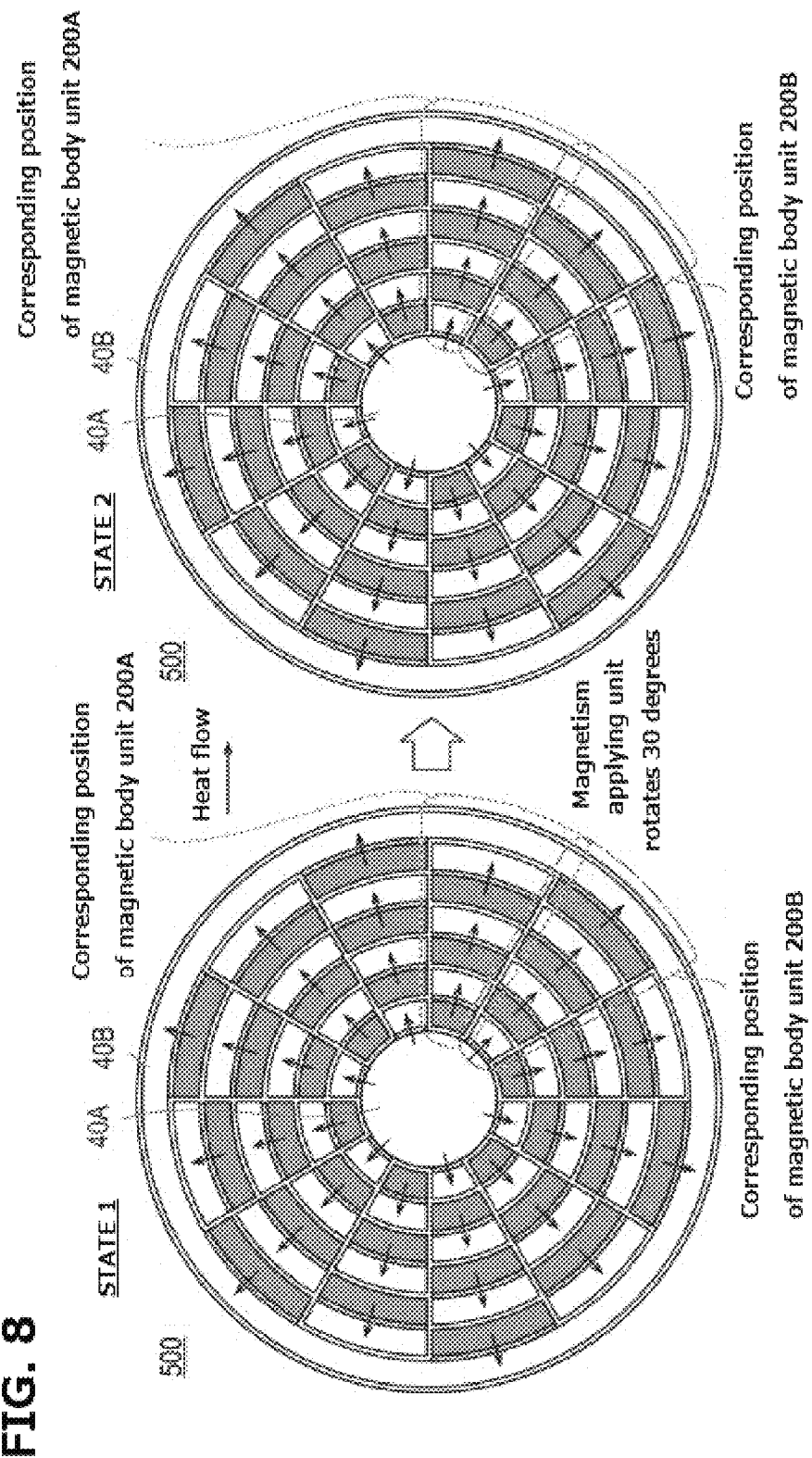
FIG. 8 is a diagram explaining the operation of the magnetic refrigerator according to the first embodiment.

FIG. 4 is a top view illustrating a schematic configuration of the magnetic refrigerator pertaining to the first embodiment. The figure is illustrated as a perspective view from the top so that the relative positions of the magnetic member, permanent magnet constituting a magnetic circuit and a heat conductive member is understandable. FIGS. 5A to 5C are a top view of the heat exchange unit support plate, a magnetic body arranged plate, and a magnet/heat conductive member arranged plate, respectively, which are constituents of the magnetic refrigerator. FIG. 6 is an exploded cross sectional diagram of the magnetic refrigerator shown in FIG. 4. FIGS. 7A and 7B together are a schematic diagram explaining the state in which heat transfers when the magnet/heat conductive member arranged plate of the magnetic refrigerator pertaining to the present embodiment is rotated between FIGS. 7A and 7B. FIG. 8 is a diagram explaining the operation of the magnetic refrigerator pertaining to the present embodiment. Note that in FIGS. 7A and 7B, the illustration of the driving unit shown in FIG. 6 is omitted.

The magnetic refrigerator according to the present embodiment uses the same principle of the magnetic refrigeration shown in FIGS. 1A and 1B. In order to allow for magnetic refrigeration using this principle, the following configuration is provided.

As shown in FIGS. 4 to 7, the magnetic refrigerator 500 according to the present embodiment has a circular heat exchange unit support plate 600 (see FIG. 5A), a hollow disk shaped magnetic body arranged or disposed plate with an opening in the center portion (see FIG. 5B), and a hollow disk shaped magnet/heat conductive member arranged plate 800 with an opening in the center (see FIG. 5C). The heat exchange unit support plate has a low-temperature side heat exchange unit 40A at its central part and a high-temperature heat exchange unit 40B at its periphery part. The magnet/heat conductive member arranged plate 800 has two disks spaced apart from each other, i.e. an upper side disk 800A and lower side disk 800B (see FIG. 6). In the magnetic refrigerator 500, the heat exchange unit support plate 600, the magnetic body arranged plate 700, and the magnet/heat conduction unit arranged plate 800 are arranged concentrically (see FIGS. 4, 6, and 7B, in particular). The magnetic body arranged plate 700 is inserted between the upper disc 800A and lower disc 800B of the magnet/heat conduction unit arranged plate 800. The low-temperature side heat exchange unit 40A is disposed in a hollow space formed by the center part of the magnetic body arranged plate 700 and that of the magnet/heat conduction unit arranged plate 800. The high-temperature side heat exchange unit 40B is disposed on the outer periphery of the magnetic body arranged plate 700 and the magnet/heat conduction unit arranged plate 800 (see FIGS. 4, 6, and 7).

Note that, since positive magnetic body is disposed on the magnetic body arranged plate 700 in the present embodiment, the heat exchange unit support plate 600 has disposed a low-temperature side heat exchange unit 40A at its center area while arranging a high-temperature side heat exchange unit 40B at its outer periphery. When a negative magnetic body is placed on the magnetic body arranged plate 700, the high-temperature side heat exchange unit 40B is arranged at the center portion of the heat exchange unit support plate 600 while disposing the low-temperature side heat exchange unit 40A on its outer periphery. The arrangements of the low-temperature side heat exchange unit 40A and the high-temperature side heat exchange unit 40B are different depending on which of the positive and negative magnetic material is to be used.

As shown in FIG. 5A, a circular low-temperature side heat exchange unit 40A is erected in the center portion of the heat exchange unit support plate 600 of the magnetic refrigerator 500 and serves to provide a fixed shaft of the magnet/heat conductive member arranged plate 800. Further, on the outer periphery of the heat exchange unit support plate 600, a hollow cylindrical, high-temperature side heat exchange unit 40B is erected along the outer periphery of the heat exchange unit support plate 600 and serves to fix the magnetic body arranged plate 700.

As shown in FIG. 5B, the magnetic body arranged plate 700 is a hollow disc with the center portion open, and the opening diameter of the central portion is set slightly larger than the diameter of the low-temperature side heat exchange unit 40A. Further, the diameter of the magnetic body arranged plate 700 is made up into the same dimension as the inner periphery of the high-temperature side heat exchange unit 40B of the cylindrical shape. As shown in FIGS. 6 and 7A, 7B, the magnetic body arranged plate 700 is fixed to the high-temperature side heat exchange unit 40B through the insulation 525B. Between the magnetic body arranged plate 700 and the high-temperature side heat exchange unit 40B, it is preferable to interpose a heat insulating material (not shown) so that the heat does not move between the magnetic body arranged plate 700 and the high-temperature heat exchange unit 40B.

A plurality of magnetic members are disposed both in annual and radial directions with a distance from each other on one side of the magnetic body arranged plate 700 (the opposing surface of the disc 800A) as shown in FIG. 5B. In the present embodiment, on each region of 30° the center angle into which the magnetic body arranged plate 700 is divided, as shown in FIG. 5B, twelve magnetic body units 200A, 200B, 200C . . . 200G, . . . and 200L are arranged side by side. Each magnetic body unit 200A, 200B, 200C . . . 200G, . . . and 200L has six magnetic members disposed toward the outer periphery from the center of the magnetic body arranged plate 700. For example, the magnetic body unit 200A has the magnetic member 10Aa, 10Ab, 10Ac, 10Ad, 10Ae, and 10Af disposed and the magnetic body unit 200B has the magnetic member 10Ba, 10Bb, 10Bc, 10Bd, 10Be, the 10Bf arranged, respectively. In each magnetic body unit, two magnetic members form a group to represent a magnetic body block. For example, in the magnetic body unit 200, the magnetic members 10Aa and 10Ab o constitute the magnetic body block 100Aa, the magnetic members 10Ac and 10Ad constitute the magnetic body block 100Ab, and the magnetic members 10Ae and 10Af constitute the magnetic body block 100Ac, respectively. Further, in the magnetic body unit 200B, the magnetic members 10Ba and 10Bb constitute a magnetic body block 100Ba, the magnetic members 10Bc, 10Bd constitute a magnetic body block 100Bb, and the magnetic members 10Be, 10Bf constitute a magnetic body block 100Bc.

Thus, on the magnetic body arranged plate 700 in the present embodiment, each magnetic body unit 200A, 200B, 200C, . . . , 200G, . . . and 200L is formed by three magnetic body blocks 100Aa-100Ab-100Ac, 100Ba-100Bb-100Bc. Further, each magnetic body block 100Aa, 100Ab, 100Ac, 100Ba, 100Bb, 100Bc, . . . is formed by two magnetic members 10Aa-10Ab, 10Ac-10Ad, 10Ae-10Af, 10Ba-10Bb, 10Bc-10Bd, and 10Be-10Bf. . . . When focusing on the single magnetic body unit 200A of the magnetic body arranged plate 700 in the present embodiment, the magnetic body unit 200A is made up of six magnetic members 10Aa, 10Ab, 10Ac, 10Ad, 10Ae, and 10Af. These magnetic members form three magnetic body blocks 100Aa, 100Ab, and 100Ac. Thus, these magnetic body blocks are formed of two magnetic members 10Aa-10Ab, 10Ac-10Ac, 10Ae-10Af. The magnetic body units 200B to 200L are formed similarly with the magnetic body unit 200A. Therefore, the magnetic body arranged plate 700 in the present embodiment represents a configuration equivalent to that shown in FIG. 1A where the magnetic body units 200 are arranged in twelve rows parallel to each other.

The magnetic member 10Aa to be used in the present embodiment may be formed directly on the magnetic body arranged plate 700, but in order to be able to effectively utilize the magnetocaloric effect, the magnetic body arranged plate 700 is preferably composed of a material of large thermal resistance. With small thermal resistance, the heat generated by the magnetic members 10Aa and others would be dissipated through the magnetic body arranged plate 700. In addition, in order to increase the thermal resistance, the magnetic member 10Aa and the other are not formed on the magnetic body arranged plate 700 directly. Rather, a thermal insulating film or heat insulating layer may be interposed between the magnetic member 10Aa etc. and the magnetic body arranged plate 700.

Further, the magnetic member 10Aa, . . . may be formed integrally as a magnetic body unit on the magnetic body arranged plate 700 via the heat insulating film or heat insulating layer. Further, each magnetic body block 100A is prepared separately via the heat insulating film or heat insulating layer, and then multiple of these magnetic body blocks may be disposed on the magnetic body arranged plate 700.

In the present embodiment, the magnetic member 10Aa etc. are formed of the same material, and a positive magnetic material is used for the material. The positive magnetic material is manufactured using a material by which a paramagnetic stat and a ferromagnetic state occur reversibly where the paramagnetic state (the magnetic spin state of the disorder) occurs without magnetism being applied whereas, when applied by magnetism, a ferromagnetic state (state in which the magnetic spins are aligned in one direction) is exhibited.

The material of the positive magnetic material may be made from Gd or an alloy based on, such as Gd—Y system, Gd—Dy-based, Gd—Er system, Gd—Ho system, La La (Fe, Si) 13, La(Fe, Al) 13 and other magnetic material.

Although not used in this embodiment, it is also possible to use a negative magnetic material for the same material as the magnetic member 10Aa. The negative magnetic material transfers into different state of order depending on whether magnetism is being applied or not. Further, the negative magnetic material presents a state with high degree of order when magnetism is not being applied compared to the case where magnetism is being applied. As the negative magnetic material, such a material in used in which two states of order, i.e. an order transfer occurs in response to application/removal of magnetism. Further, the negative magnetic material takes antiferromagnetic state (state where adjacent spins aligned facing opposite directions) without magnetism being applied and undergoes a ferromagnetic state (state where adjacent spins are all pointed to one direction). The negative magnetic material may be manufactured by using a material by which a ferromagnetic state and an antiferromagnetic state occur reversibly when the magnetic moment of the material itself is changed greatly. As the negative magnetic material, it is possible to use a magnetic material such as FeRh alloy, CoMnSiGe system, or NiMnSn system.

Generally, the positive magnetic material and the negative magnetic material differ by nature from each other. Thus the magnitude in the temperature change due to magnetocaloric effect with respect to the positive magnetic material and the negative magnetic material are different due to the difference in the direction of heat generation/absorption. Therefore, as in the present embodiment, when using one of the positive and negative magnetic material, the temperature changes for all the magnetic members due to magnetocaloric effect will be the same. Therefore, a stable heat conduction characteristic as an overall magnetic refrigerator is obtained with improvement in the heat transport efficiency. Further, compared to the positive magnetic material, since the magnetocaloric effect of the negative magnetic material is smaller, considering the heat transfer efficiency, it is preferable to structure the magnetic body arranged plate 700 using a positive magnetic material. Moreover, since the negative magnetic material is rare compared to the positive magnetic material, it is also preferable to use the positive magnetic material for constituting the magnetic body arranged plate 700 in terms of the costs.

In the present embodiment, as shown in FIG. 4, FIG. 5B, and FIG. 8, the magnetic member 10Aa, etc. is shaped obtainable as if a fan would be cut in the radial direction with a constant width. However, other shapes may be employed such as spherical, ellipsoidal, cubic, cylindrical, or elliptical cylindrical shape.

As described above, the magnetic body arranged plate 700 has a magnetic body unit 200A which has a plurality of magnetic members 10Aa etc. arranged in row spaced to each other. The magnetic body arranged plate 700 has a plurality of the magnetic body units 200A arranged annually side by side with a space there between in the circumferential direction which crosses the arrangement direction of the magnetic members 10Aa etc.

The magnetic body unit 200A has a magnetic body block on which a plurality of the magnetic members 10A etc. are disposed in row with a space or gap. A plurality of the magnetic body blocks 100Aa etc. are arranged in row along the arrangement direction of the magnetic members 10Aa etc. with spacing to form the magnetic body unit 200A.

Since the magnetic body arranged plate 700 is configured above, the low-temperature side heat exchange unit 40A is located adjacent to the magnetic members 10Aa, 10Bb and etc. with a space positioned on one end of the magnetic body units 200A, 200B, 200C through 200G to 200L formed on the magnetic body arranged plate 700. Also, the high-temperature side heat exchange unit 40B is located adjacent to the magnetic members 10Af, 10Bf, etc. positioned on the other end of the magnetic body units 200A, 200B, 200C through 200G . . . to 200L formed on the magnetic body arranged plate 700.

As shown in FIG. 5C, the magnet/heat conduction unit arranged plate 800 is a hollow disc with the center portion open, and the opening diameter of the central portion is set slightly larger than the diameter of cylindrical low-temperature side heat exchange unit 40A of the heat exchange unit support plate 600. Further, the diameter of the magnet/heat conduction unit arranged plate 800 is set slightly smaller than the size of the inner periphery of the cylindrical high-temperature side heat exchange unit 40B of the heat exchange unit support plate 600. This configuration is intended to ensure the magnet/heat conduction unit arranged plate 800 is allowed to rotate between the low-temperature heat exchange unit 40A and the high-temperature heat exchange unit 40B. The magnet/heat conduction unit arranged plate 800 is composed of two, i.e. upper and lower discs 800A, 800B, which are connected magnetically with a gap interposed.

Note that, between the lower-side heat exchange unit 40A and the upper disc 800A, and between the lower-temperature side heat exchange unit 40A and the upper disc 800A, and between the lower-temperature side heat exchange unit 40A and the lower disc 800B, insulating material 525A is interposed to block heat transfer between the low-temperature side heat exchange unit 40A, the upper disc 800A, the lower disc 800B. Further, it is preferable for the bearings 520Ab and 520Bb to insulating property to block the heat transfer among the high-temperature side heat exchange unit 40B, the upper disc 800A, and the lower disc 800B. For this purpose, for example, the bearings 520Ab and 520Bb themselves may be made of thermal insulation material. Alternatively, the bearings 520Ab and 520Bb may have a heat insulating film coated on the surfaces.

The two discs, i.e. the upper side and lower side discs 800A, 800B are configured to be separately rotatable about the low-temperature side heat exchange unit 40A and supported by a bearing provided at the low-temperature side heat exchange unit 40A or by a bearing provided on the outer periphery of the upper and lower discs 800A, 800B, respectively. As shown in FIG. 6, the upper disc 800A is rotatably supported by the bearings 520Aa, 520Ab, while the lower disc 800B is rotatably supported by the bearings 520Ba, 520Bb. Therefore, the upper disc 800A may rotate separately from the lower disc 800B. Reference numbers 560A, 560B constitute a driving unit.

When the servo motor 540A is rotated, the ring gear 560A meshed with the gear 550A rotates on its axis to rotate the upper disc 800A. Further, when the servo motor 540B is rotated, the ring gear 560B meshed with the gear 550B rotates about its axis to rotate the lower disc 800B. In addition, when the upper and lower discs are rotated in synchronization, the two, i.e. the upper and lower discs 800A, 800B rotate integrally.

In the present embodiment, the servo motors 540A and 540B are rotated in synchronization. Therefore, the magnet/heat conduction unit arranged plate 800 is rotated about the low-temperature side heat exchange unit 40A between the low-temperature side heat exchange unit 40A and the high temperature side heat exchange unit 40B by sandwiching the magnetic body arranged plate 700 by the upper and lower discs 800A, 800B.

On one side of the upper disc 800A constituting the magnet/heat conduction unit arranged plate 800 (under side of the disc 800A shown in FIGS. 6 and 7A, 7B), as shown in FIG. 5C, a plurality of permanent magnets and the plurality of heat conductive members are arranged. One permanent magnet is arranged to face each of the magnetic body blocks 100Aa, 100Ab, 100Ac, 100Ba, 100Bb, and 100Bc of the magnetic body unit 200A, 200B, 200C through 200G to 200L. Each time the permanent magnet moves over to the adjacent magnetic body unit in accordance with the rotation of the magnet/heat conduction unit arranged plate 800 by 30° C., the permanent magnet performs a reciprocal movement in a radial direction within the magnetic body block 100Aa, 100Ab, 100Ac, 100Ba, 100Bb, and 100Bc, etc. of the adjacent magnetic body unit 200A, 200B, 200C through 200G to 200L. Therefore, the permanent magnet applies magnetism separately to the magnetic member of the magnetic body unit 200A, 200B, 200C through 200G to 200L.

For example, as shown in FIG. 4, FIG. 5B, FIG. 5C and FIG. 7A, on the upper disc 800A of the magnet/heat conductive member arranged plate 800, the permanent magnets 20Aa, 20Ac, and 20Ae present in the corresponding position of the magnetic body unit 200A are respectively disposed to oppose the magnetic member 10Aa, 10Ac, and 10Ae of magnetic body unit 200A of the magnet body arranged plate 700. Further, the permanent magnets 20Ba, 20Bc, and 20Be disposed in the corresponding position of the magnetic body unit 200B are respectively disposed to oppose the magnetic members 10Bb, 10Bd, and 10Bf. In this state, when the magnet/heat conductive member arranged plate 800 rotates by 30° in a clockwise direction, the permanent magnets 20Aa, 20Ac, and 20Ae disposed in the corresponding position of the magnetic body unit 200A are brought to the positions respectively corresponding to the magnetic members 10Ba, 10Bc, and 10Be of the magnetic body unit 200B. Further, the permanent magnets present in the corresponding position of the magnetic body will be brought to positions to oppose the magnetic members 10Ab, 10Ad, and 10Af, respectively. In other words, each time the magnet/heat conductive member arranged plate 800 rotates by 30° clockwise, in each of the magnetic body units 200A, 200B, 200C through 200G to 200L, the permanent magnet moves reciprocally in each magnetic body block. The positional relationship between this permanent magnet and the magnetic body represents the same the situation in which, each time the magnet/heat conductive member arranged plate 800 rotates 30 degrees, the positional relationship is repeatedly alternated between FIG. 1A and FIG. 1B.

Therefore, when moving the magnet/heat conductive member arranged plate 800 in the arrangement direction of the magnetic body units 200, 200B, 200C through 200G to 200L, the positional relationship between the permanent magnet and the magnetic body transfers as follows.

First, as shown in FIG. 4 and FIG. 7A, the permanent magnets 20Aa, 20Ac, and 20Ae apply magnetism to the magnetic members 10Aa, 10Ac, and 10Ae at the same time positioned on one end of each magnetic body block 100Aa, 100Ab, 100Ac of one of the adjacent magnetic body unit, 200A. Further, as shown in FIG. 4 and FIG. 7B, the permanent magnets 20Ba, 20Bc, and 20Be apply magnetism to the magnetic members 10Bb, 10Bd, and 10Bf at the same time positioned on the other end of the adjacent magnetic body unit, 200B. With respect to the other magnetic body units 200C to 200L, the positional relationship between the permanent magnet and the magnetic member between two adjacent magnetic body units is the same as the case of magnetic body units 200A and 200B. The positional relationship between the permanent magnet and the magnetic body or member described above between two adjacent magnetic units is referred to as State 1.

Next, when the magnet/heat conductive member arranged plate 800 is rotated 30° clockwise, the permanent magnets 20Aa, 20Ac, and 20Ae simultaneously apply magnetism to the magnetic members 10Ba, 10Bc, and 10Be positioned on the one end of each magnetic body block 100Ba, 100Bb, and 100Bc of the other one of the adjacent magnetic body units, 200B. This state is the same as the situation in which the permanent magnets 20Ba, 20Bc, and 20Be shown in FIG. 7B move to the magnetic members 10Ba, 10Bc, and 10Be on the left side. On the other hand, the permanent magnets present in the corresponding position of the magnetic body unit 200L apply magnetism simultaneously to the magnetic members 10Ab, 10Ad, and 10Af positioned on the other end of each magnetic body block 100Aa, 100Ab, and 100Ac of the one of the adjacent magnetic body units, 200L. This state is the same as the situation in which the permanent magnets 20Aa, 20Ac, and 20Ae shown in FIG. 7A move to the magnetic members 10Ab, 10Ad, and 10Ae on the right side. With respect to the other magnetic body units 200C to 200L, the positional relationship of the permanent magnet and the magnetic body between adjacent magnetic body units transition in the same manner as in the case of the magnetic body units 200A, 200B. The positional relationship of the permanent magnet and the magnetic body between adjacent magnetic body units is referred to as State 2.

Thus, each time the magnet/heat conductive member arranged plate 800 is rotated 30°, in all the he magnetic body units 200A1, 200B, 200C through 200G to 200L, the state 1 and the state 2 are repeated. In other words, in all the magnetic body units, 200A, 200B, 200C, . . . , 200G, . . . , and 200L, the state in FIG. 1A and the state in FIG. 1B are repeated.

On one side of the lower disc 800B forming the magnet/heat conductive member arranged plate 800 (on the upper side of the disc 800B shown in FIGS. 6, 7A), magnetic projections are formed. The magnetic projection is arranged so as to correspond to the arrangement of the permanent magnet disposed on one side of the upper disc 800A. For example, as shown in FIGS. 6, 7A, the magnetic projection 20Ab is provided to correspond to the permanent magnet 20Aa, the magnetic projection 20Ad to correspond the permanent magnet 20Ac, the magnetic projection 20Af to correspond the permanent magnet 20Ae, respectively. Further, the magnetic projection 20B is arranged to correspond to the permanent magnet 20Ba, the magnetic projection 20Bd to correspond to the permanent magnet 20Bc, and the magnetic projection 20Bf to correspond to the permanent magnet 20Be, respectively. By receiving the magnetic force lines from each permanent magnet, it is intended that the magnetic resistance between the permanent magnet and the magnetic projection is kept minimized and the magnetic force lines from the permanent magnet will pass through the magnetic body without leak.

The magnet/heat conductive member arranged plate 800 is composed of two, magnetically connected flat plates that sandwich the magnetic body arranged plate 700. The permanent magnet disposed on the upper disk 800A and the magnetic projection disposed on the lower disc 800B forms a magnetic circuit between the upper disc 800A and lower disc 800B. This magnetic circuit constitutes a magnetism applying unit. In the present embodiment, a permanent magnet is used for the mechanism to generate magnetism. However, in place of the permanent magnet, it is also possible to use electromagnets or superconducting magnets. When configured by an electromagnet to form a magnetic circuit, it is possible to change the range of the magnitude of the magnetic applied to the magnetic body. It is possible to impart the versatility to the magnetic applying unit. However, from the point of view of the utility and energy conservation, the use of permanent magnet is desirable.

In the present embodiment, a permanent magnet is arranged on the upper disc 800A while a magnetic projection is disposed in the lower disc 800B. It is also possible to have the opposite structure from this. The magnetic projection may be arranged on the upper disc 800A while the permanent magnet may be placed on the lower disc 800B. Further, in the present embodiment, both discs are jointly rotated as unity. However, if magnetically connected, the two discs may be arranged separately. Since the upper disk 800A and the lower disc 800B are magnetically connected and the permanent magnet is provided to face the magnetic projection, the magnetic flux from the permanent magnet may be utilized efficiently and the miniaturization of the permanent magnet and weight reduction are possible.

All the permanent magnets provided on the magnet/heat conductive member arranged plate 800 are provided with a heat conductive member on the outer periphery of each permanent magnet, as shown in FIGS. 4, 5C, 6 and 7A, 7B. The heat conductive member conducts or transfers the heat generated in each magnetic body unit from the low-temperature side heat exchange unit to the high-temperature side heat exchange unit. The heat condition material is selectively inserted or removed between magnetic members, in the direction of rotation of the magnet/heat conductive member arranged plate 800. When the heat conductive member is inserted between magnetic members, heat is conducted between the magnetic members. When the heat conductive member is inserted between the magnetic member and the low-temperature side heat exchange unit, heat conduction takes place between the magnetic member and the low-temperature side heat exchange unit. Moreover, when the heat conduction is conducted between the magnetic body and high-temperature side heat exchange unit, heat transfers between the magnetic member and the high-temperature side heat exchange unit.

As shown in FIG. 5C, the heat conductive members are provided on one side of the upper disc 800A forming the magnet/heat conductive member arranged plate 800 (lower side of the disc 800A shown in FIGS. 6, 7A and 7B) at four or three locations on each magnetic body unit 200A, 200B, 200C through 200G to 200L. As shown in FIG. 5C, at the corresponding positions of the magnetic body unit 200A, three heat conductive members 30Ab, 30Ad, and 30Af are provided on the side of outer periphery of the permanent magnet 20Aa, 20Ac, and 20Ae. In the corresponding position on the magnetic body unit 200B, four heat conductive members 30Ba, 30Bc, 30Be and 30Bg are provided. The heat conductive members 30Bc, 30Be, 30Bg are provided on the outer periphery of the permanent magnet 20Ba, 20Bc and 20Be.

All the heat conductive members 30Ab, 30Ad, 30Af, 30Ba, 30Bc, 30Be, 30Bg, etc. is made of solid high heat conduction material that facilitates heat conduction. As high heat conduction materials, Cu or Al is desirable.

The thickness of the heat conductive member in a radial direction is set to such a size such that the heat conductive member can be tightly received in or be slightly larger than the gap between the magnetic members, that between the magnetic member and the low-temperature side heat exchange unit 40A, or that between the magnetic member and the high-temperature side heat exchange unit 40B. For example, the radial thickness of the heat conductive member 30Ab, 30Ad, 30Af, 30Ba, 30Bc, 30Be, 30Bg etc. is determined such that these can be inserted respectively between the magnetic members, 10Aa-10Ab, 10Ac-10Ad, 10Ae-10Af, the low-temperature side heat exchange unit 40A-magnetic member 10Ba, magnetic member 10Bb-10Bc, 10Bd-10Be, the magnetic member 10Bf-high temperature side heat exchange unit 40B while ensuring heat conduction between these. Further, the shape of the heat conductive member 30Ab, 30Ad, 30Af, 30Ba, 30Bc, 30Be, 30Bg etc. may be preferably shaped to match the respective shape of the gap between the magnetic members, 10Aa-10Ab, 10Ac-10Ad, 10Ae-10Af, the low-temperature side heat exchange unit 40A-magnetic member 10Ba, magnetic member 10Bb-10Bc, 10Bd-10Be, the magnetic member 10Bf—the high temperature side heat exchange unit 40B.

The portion of the heat conductive member 30Ab and etc. on which the magnetic member 10Aa etc., the low-temperature side heat exchange unit 40A, and the high-temperature heat exchange unit 40B are in contact, may be formed in a coating layer with high heat conductivity and high anti-wearness. For example, by applying carbon nanotubes on the surface of the heat conductive member 30Ab etc., both the wear resistance and heat conductivity are preferably improved. Further, the heat conductive member 30Ba to be inserted between the magnetic member 10Ba and the low-temperature side heat exchange unit 40A as well as the heat conductive member 30Bg to be inserted between the magnetic member 10Bf and the high-temperature side heat exchange unit 40B may be different in material or structure from the heat conductive members 30Bc, 30Be which cause heat conduction to the magnetic members 10Ba-10Bf.

Note that the magnet/heat conductive member arranged plate 800 is preferably made from the material of low thermal conductivity with high heat resistance in order to prevent the heat generated by the magnetic body 10Aa etc. and the heat conducted through the heat conductive member 30Aa from being escaped.

When the magnet/heat conductive member arranged plate 800 having the above configuration is rotated with respect to the magnetic body arranged plate 700, the heat conductive member 30Ab, . . . transfers heat in the following manner.

First, when the positional relationship of the permanent magnet and the magnetic body is found in the state 1 shown in FIGS. 4 and 8, in the corresponding position of the magnetic body unit 200A, the positional relationship between the heat conducting member and the magnetic body may be illustrated as in FIG. 7A.

In the state 1, as shown in FIG. 7A, the permanent magnet 20Aa is positioned to the magnetic member 10Aa, the permanent magnet 20Ac to the magnetic member 10Ac, and the permanent magnet 20Ae to the magnetic member 10Ae, respectively. At this time, the magnetic members 10Aa, 10Ac, and 10Ae are applied with magnetism while the magnetic members 10Ab, 10Ad, and 10Af are free from magnetism and not magnetized. At this time, the magnetic members 10Aa, 10Ac, and 10Ae generate heat. At the same time, the heat conductive member 30Ab is inserted between the magnetic members 10Aa and 10Ab, the heat conductive member 30Ad between the magnetic member 10Ac and 10Ad, the heat conductive member 30Af between the magnetic members 10Ae and 10Af, respectively. Thus, heat conduction is performed between the adjacent magnetic members within each magnetic body block. In other words, the heat generated by the magnetic members 10Ab, 10Ad, and 10Af through magnetocaloric effect is transferred to the magnetic members 10Ab, 10Ad, and 10Af, respectively. In addition, in this state, there is no heat conduction between the low-temperature side heat exchange unit 40A and the magnetic member 10Aa and between the high-temperature side heat exchange unit 40B and the magnetic unit 10Af. Also, no heat conduction is made between the magnetic body blocks.

Further, in the corresponding position of the magnetic body unit 200B, the positional relationship between the heat conducting member and the magnetic body is such as shown in FIG. 7B.

As shown in FIG. 7B, the permanent magnet 20B is positioned to the magnetic member 10Bb, the permanent magnet 20Bc to the magnetic member 10Bd, and the permanent magnet 20Be to the magnetic member 10Af, respectively. In this instance, the magnetic members 10Bb, 10Bd, and 10Bf are applied with magnetism while the magnetic members 10Ba, 10Bc, and 10Be are not applied with magnetism but the magnetism is removed from. At this time, the magnetic members 10Bb, 10Bd, and 10Bf generate heat. At the same time, the heat conductive member 30Ba is inserted between the low-temperature side heat exchange unit 40A and the magnetic member 10Ba, the heat conductive member 30Bc between the magnetic members 10Bb and 10Be, the heat conductive member Be between the magnetic members 10Bd and 10Be, the heat conductive member 30Bg between the magnetic member 10Bf and the high-temperature side heat exchange unit 40B, respectively. Thus heat conduction takes place between the adjacent magnetic members, 10Bb-10Bc, 10Bd-10Be between the adjacent magnetic body blocks 100Ba, 100Bb, and 100Bd. Also, heat conduction occurs between the magnetic member 10Ba positioned on one end of the magnetic body unit 200B and the low-temperature side heat exchange unit 40A as well as between the magnetic member 10Bf and the high-temperature side heat exchange unit 40B. In other words, the magnetic members 10Ba, 10Bd, and 10Bd absorb heat through magnetocaloric effect while the magnetic members 10Bb, 10Bd, and 10Bf generate heat through magnetocaloric effect. Therefore, heat transfers from the low-temperature side heat exchange unit 40A to the magnetic member 10Ba, from the magnetic member 10Bb to the magnetic member 10Bc, from the magnetic member 10Bd to the magnetic member 10Be, and from the magnetic member 10Bf to the high-temperature heat exchange unit 40B.

As described above, a plurality of magnetic applying unit arranged on the magnet/heat conductive member arranged plate 800 exhibit magnetocaloric effect by selectively approaching or departing from a plurality of magnetic bodies disposed on the magnetic body arranged plate 700 in response to a relative movement between the magnet/heat conductive member arranged plate 800 and magnetic body arranged plate 700. Further, a plurality of the heat conductive members disposed on the magnet/heat conductive member arranged plate are configured to selectively insert or remove from between the magnetic members disposed in the magnetic body arranged plate 700, between the low-temperature side heat exchange unit 40A and the magnetic member, and between the high-temperature side heat exchange unit 40B and the magnetic member to conduct the heat generated by magnetocaloric effect in response to the relative movement between the magnet/heat conductive member arranged plate 800 and the magnetic body arranged plate 700.

The state 1 described above is shown in FIG. 8. In the corresponding position of the magnetic body unit 200A, heat is transferred between the adjacent magnetic members within each magnetic body block, while in the corresponding position of the magnetic body unit 200B, heat is conducted between the adjacent magnetic members of the adjacent magnetic body blocks, between the magnetic member positioned on one end of the magnetic body unit 200B and the low-temperature heat exchange unit 40A, and between the magnetic member positioned on the other end of magnetic body unit 200B and the high-temperature side heat exchange unit 40B.

When the positional relationship between the permanent magnet and the magnetic body is found in the state 1 shown in FIG. 8, in the corresponding position of the magnetic body unit 200A, the positional relationship between the heat conductive member and the magnetic body is equivalent to that shown in FIG. 7A. At the same time, in the corresponding position of the magnetic body unit 200B, the positional relationship between the heat conductive member and the magnetic body is equivalent to that shown in FIG. 7B.

Now after rotating the magnet/heat conductive member arranged plate 800 by 30° clockwise to bring the positional relationship between the permanent magnet and the magnetic body in the state 2 shown in FIG. 8, in the corresponding position of the magnetic body unit 200A, the positional relationship between the heat conductive member and the magnetic body is equivalent to that shown in FIG. 7B. At the same time, in the corresponding position of the magnetic body unit 200B, the positional relationship between the heat conductive member and the magnetic member is equivalent to that shown in FIG. 7A. The positional relationship between the permanent magnet and the magnetic body is opposite from the positional relationship between the permanent magnet and the magnetic body with respect to between the adjacent magnetic body units.

The state 2 described above is shown in FIG. 8. In the corresponding position of the magnetic body unit 200A, heat is conducted between the adjacent magnetic members between the adjacent magnetic body blocks, between the magnetic member positioned on one end of the magnetic body unit 200A and the low-temperature side heat exchange unit, and between the magnetic member positioned on the other end of the magnetic body unit 200A and the high-temperature side heat exchange unit 40B. In the corresponding position of the magnetic body unit 200B, heat is conducted between the adjacent magnetic members in each magnetic body block.

As described above, in the state 1, the heat conductive member of the magnet/heat conductive member disposed or arranged plate 800 provides thermal transfer between adjacent magnetic members within each magnetic body block of one of adjacent magnetic body units while also providing thermal transfer between adjacent magnetic members of the adjacent magnetic blocks of the other of the adjacent body units, between the magnetic member positioned at one end of the other magnetic body units and the low-temperature side heat exchange unit and between the magnetic member at the other end of the other magnetic body unit and the high-temperature side heat exchange unit. Further, in the state 2, heat conduction takes place between the adjacent magnetic members within each magnetic body block of the other adjacent magnetic body units while the heat conduction occurs between the adjacent magnetic members of the adjacent magnetic blocks of the one adjacent magnetic body unit, between the magnetic member at one end of the one magnetic body unit and the low-temperature side heat exchange unit, and between the magnetic member at the other end of the one adjacent magnetic body unit.

The driving unit shown in FIGS. 6 and 7A, 7B is intended to drive the magnetic body arranged plate 700 or the magnet/heat conductive member arranged plate 800 to move the magnetic body arranged plate 700 and the magnet/heat conductive member arranged plate 800 relatively. As long as the magnetic body arranged plate or the magnet/heat conductive member arranged plate 800 can be rotated, any types of the electric motor may be employed. In the present embodiment, the magnet/heat conductive member plate 800 is caused to rotate about its center as rotation axis.

The low-temperature side heat exchange unit 40A and the high-temperature side heat exchange unit 40B are provided with mechanism to perform heat exchange with an external environment such as room or indoor air. For example, such a mechanism may be adopted in which heat exchange with external environments takes place by supplying refrigerant from external.

The magnetic refrigerator pertaining to the present embodiment configured above works in the following manner as a magnetic refrigerator.

First, by operating the driving unit to rotate the magnet/heat conductive member arranged plate 800 clockwise or counter-clockwise, at each rotation of 30°, the states in FIGS. 1A, 1B, i.e. the states of FIGS. 7A and 7B are repeated alternately. That is, the state 1 and the state 2 are repeated. Through this repetition, in each magnetic body unit, heat transfers from the low-temperature side heat exchange unit 40A to the high-temperature side heat exchange unit 40B. Eventually, as in the graph shown in FIG. 2, the temperature of the low-temperature side heat exchange unit 40A is lowered while the temperature of the high-temperature heat exchange unit 40B may be raised to create a temperature difference between the low-temperature side heat exchange unit 40A and the high-temperature side heat exchange unit 40B. Note that the principle according to which the temperature difference between the low-temperature side heat exchange unit 40A and the high-temperature side heat exchange unit 40B will be expanded is the same as the principle explained with reference to FIGS. 3A-3E.

When configuring a magnetic refrigerator of large cooling capacity, the number of the magnetic blocks arranged in series is increased to connect to both the low-temperature side heat exchange unit 40A and the high-temperature side heat exchange unit 40B. By increasing the number of serially connected magnetic body blocks, it is possible to increase further the temperature difference between the high-temperature side heat exchanger 40B and the low-temperature-side heat exchanger 40A.

The magnetic refrigerator of the present embodiment can be applied to an air conditioner performing air conditioning, a refrigerator, a vehicle air conditioner that performs air conditioning of a passenger compartment, and refrigeration system of the vehicle, etc.

In the present embodiment, such a configuration is illustrated in which a permanent magnet, heat conductive member and the magnetic projection are formed on a magnet/heat conductive arranged plate 800. When the permanent magnet, heat conductive member and the magnetic projection are formed integrally, the size of the magnet/heat conductive member arranged plate 800 may be miniaturized and made light-weighted.

Further, in the present embodiment, both the magnetic body arranged plate 700 and the magnet/heat conductive member arranged plate 800 are formed in circular shape and rotated relative to each other. The magnetic body arranged plate 700 and the magnet/heat conductive member arranged plate 800 may be formed flat for a linear reciprocal movement relative to each other.

When the magnetic refrigerator is configures as described above, simply by relatively moving the magnetic body arranged plate 700 against the magnet/heat conductive member arranged plate 800 in the arrangement direction of the magnetic body units, magnetic refrigeration is available so that the configuration of the magnetic refrigerator is simplified and miniaturization, light-weightiness, and low cost may be achieved.

Next, the specific configuration of the magnetic refrigerator according to the second embodiment will be described with reference to FIGS. 5A-5C and FIGS. 9A and 9B. In the magnetic refrigerator pertaining to the second embodiment, the sizes or dimensions of the magnetic body, the magnetic circuit and the heat conductive member are varied toward outside from the center so that the heat transfer characteristic may be made appropriate.

Figure 9A:
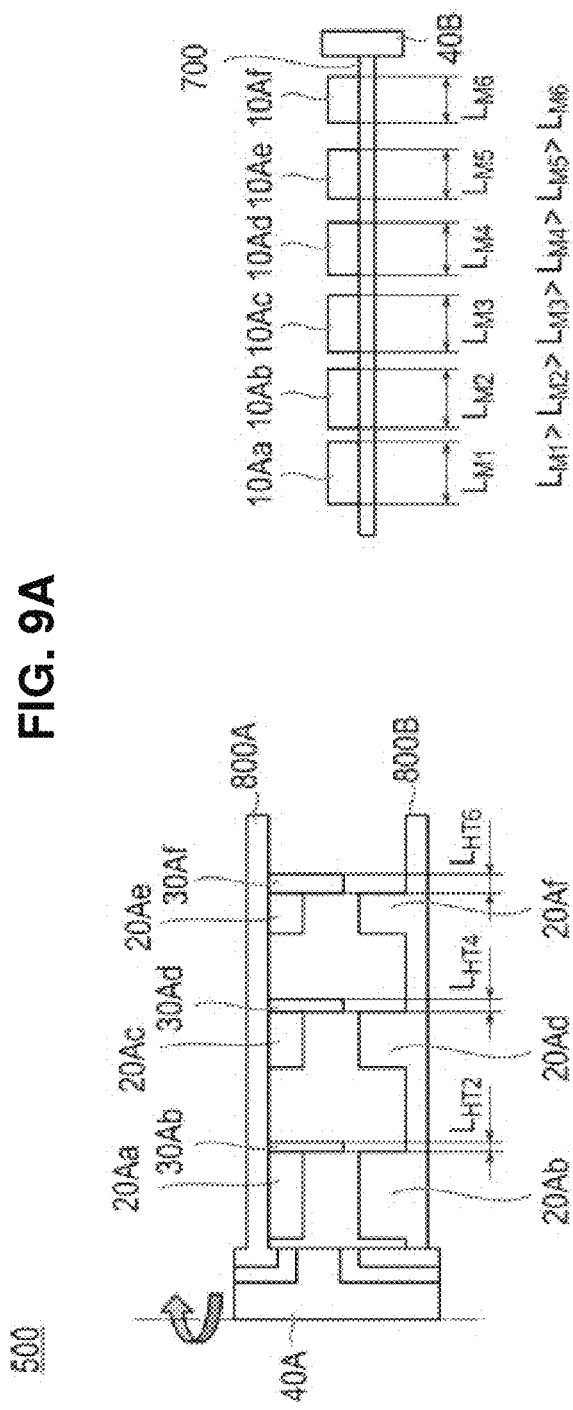
FIG. 9A is an exploded cross-sectional view of the magnetic refrigerator according to a second embodiment, with FIG. 9B being an exploded view of member 30A of FIG. 9A.
Figure 9B:
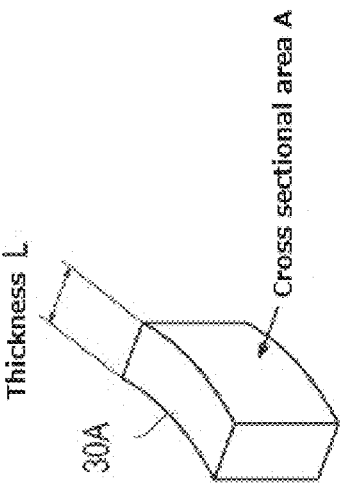

In the present embodiment, as shown in FIG. 5B and FIG. 9A, the magnetic members 10Aa, 10Ab, 10Ac, 10Ad, 10Ae, 10Af for forming a magnetic unit 200A in the magnetic body arranged plate 700, have the same volume, respectively. This is intended to ensure the same heat capacity of the adjacent magnetic members in the radial direction toward the outer periphery from the inner periphery of the magnetic body arranged plate 700. As shown in FIG. 5B, the magnetic members 10Aa, 10Ab, 10Ac, 10Ad, 10Ae, 10Af have the shape as cut by a constant width in the radial direction of the fan. In this shape, when the same thickness in the radial direction of all the magnetic members 10Aa, 10Ab, 10Ac, 10Ad, 10Ae, the 10Af, the volume of the magnetic members are different. For this reason, the amount of heat obtained by magnetocaloric effect is different, thus it is not possible to conduct heat evenly magnetic material between adjacent. Therefore, the efficiency of the heat transport is reduced. For example, if the heat capacity of the magnetic member of one of the adjacent members is larger than the heat capacity of the magnetic member of the other, heat is not fully passed to the small magnetic member from the magnetic member with larger heat capacity. In the reversed case of this situation, heat can be successfully conveyed from the small capacity magnetic member to the larger magnetic member. However, because of the difference in heat capacity, the temperature change at the member that has received heat is not sufficient. Therefore, the situation in which heat transfer can be performed most efficiently is the situation in which the heat capacity of the magnetic members is the same and thus the volume thereof the same. In the present embodiment, since the same volume is used for all the magnetic members, the heat transfer efficiency of the magnetic refrigerator is improved, and heat transfer efficiency and the heat transport capability of the magnetic refrigerator will be improved.

Under such circumstances, in the present embodiment, as shown in FIG. 9A, the radial thickness of respective magnetic members 10Aa, 10Ab, 10Ac, 10Ad, 10Ae, the 10Af are respectively defined as LM1, LM2, LM3, LM4, LM5, LM6 and are configured to meet the following formula: LM1>LM2>LM3>LM4>LM5>LM6.

And yet, the thickness of these members is dimensioned in such a way that the heat capacity of all the magnetic members 10Aa, 10Ab, 10Ac, 10Ad, 10Ae, and 10Af is the same. Since the magnetic members 10Aa, 10Ab, 10Ac, 10Ad, 10Ae, and 10Af are shaped by cutting a fan radially, the length along the periphery will be greater from inner periphery toward the outer periphery. To ensure the same volume, the thickness is set thinner from the center.

The same holds true on the magnetic body units 200B, 200C through 200G to 200L. Greater is the same in 200L, the magnetic unit 200B, 200C, . . . , 200G, . . . shown in FIG. 5B.

As shown in FIG. 9A, the radial thickness of the permanent magnets 20Aa, 20Ac, and 20Ae that are disposed on a disc 800A at the upper side of the magnet/heat conductive member disposed plate 800 is thinner from the inner circumference toward the outer circumference of the circular plate 800A, and is adjusted to the radial thickness of the magnetic members 10Aa, 10Ac, and 10Ae. The radial thickness of the magnetic projections 20Ab, 20Ad, 20Af which are disposed in a lower disc 800B will be thinner from the inner periphery toward the outer periphery of the disc 800B, and configured to match the radial thickness of the facing permanent magnets 20Aa, 20Ac, 20Ae. Note that the permanent magnet and the opposing magnet projection may form part of the magnetic circuit as described above.

Further, as shown FIG. 9A, FIG. 9B, FIG. 5C and FIG. 5B, the permanent magnets 20Aa, 20Ac, 20Ae are shaped the same as the shape of the opposing magnetic members 10Aa, 10Ac, and 10Ae. That is, the shape and dimensions in the facing direction between the magnetic members 10Aa and the permanent magnet 20Aa are the same. The permanent magnet 20Ac and the magnetic member 10Ac as well as the permanent magnet 20Ae and the magnetic body 10Ae are shaped and sized the same in the facing direction.

In addition, the radial thickness LTH2, LTH4, and LTH6 of the heat conductive members 30Ab, 30Ad, and 30Af disposed on the upper disk 800A of the magnet/heat conductive member arranged plate 800 is made sequentially thicker from the inner periphery to the outer periphery of the circular disc 800A.

This is to keep the mechanical strength of heat conductive member 30Ab, 30Ad, and 30Af. Since the speed of the disc 800A at outer peripheral side is faster than the inner peripheral side, a larger centrifugal force is received at the outer peripheral side of the heat conductive member. Therefore, increasing the radial thickness of the heat-conducting member 30Ab, 30Ad, 30Af is advantageous in maintaining mechanical strength. Further, the length of the circumferential of heat conducting member 30Ab, 30Ad, the 30Af, are successively longer toward the outer periphery from the inner periphery of the circular plate 800A. This is because the lower the thermal resistance of radial heat-conducting member 30Ab, 30Ad, and 30Af. Therefore, it is determined by the thickness of the heat conducting member 30Ab, 30Ad, of 30Af placed interval magnetic material 10Aa, 10Ab, 10Ac, 10Ad, 10Ae, of 10Af. The shapes of the heat conductive member 30Ab, 30Ad, of 30Af are adapted to the respective shape of the gap of the magnetic member/body Aa-10Ab, 10Ac-10Ad, of 10Ae-10Af.

In addition, when the radial thickness of the heat conductive member 30Ab, 30Ad, and 30Af becomes thick, thermal resistance in the radial direction of the heat conductive member will increase. However, since the circumferential dimension of the magnetic members 10Aa, 10Ab, 10Ac, 10Ad, 10Ae, and 10Af is set longer from the inner periphery to the outer periphery, the cross section A of the heat conductive members 30Ab, 30Ad, and 30Af as seen from the radial direction becomes large and the respective heat resistance of the heat conductive members 30Ab, 30Ad, and 30Af will be substantially the same.

Under such circumstances, in the present embodiment, as is shown in FIG. 9A, the radial thickness of the heat conductive members 30Ab, 30Ad, and 30Af, LTH2, LTH4, and LTH6 are set to such thickness to meet the relationship; LTH2<LTH4<LTH6. Further, the circumferential length of the heat conductive members 30Ab, 30Ad, and 30Af is set in accordance with the shape of the respective gaps formed between magnetic members 10Aa-10Ab, 10Ac-10Ad, and 10Ae-10Af, respectively so as to be successively longer from the inner periphery to the outer periphery of the disc 800A.

Figure 10:
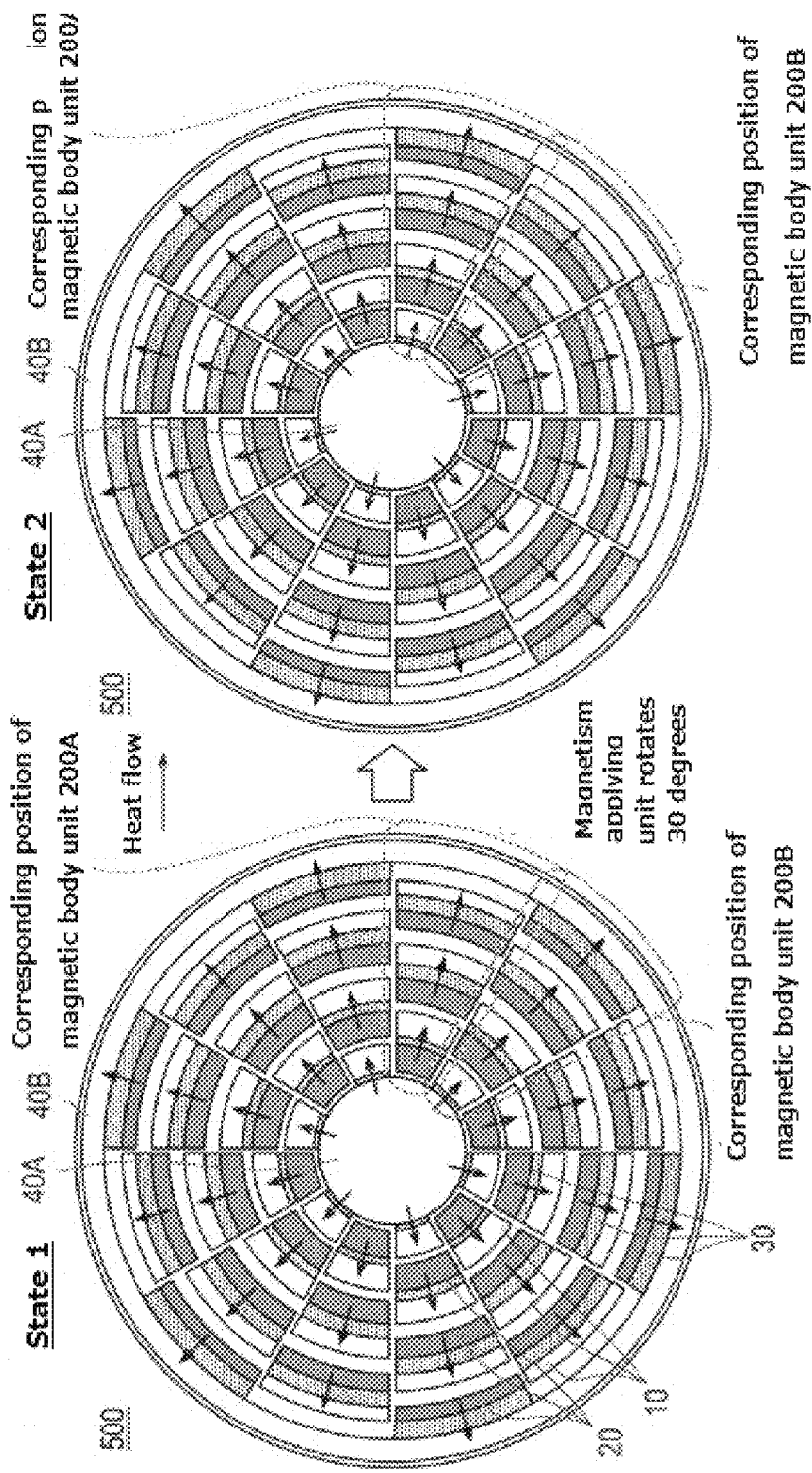
FIG. 10 is a diagram explaining the operation of the magnetic refrigerator according to the second embodiment.

As described above, with the dimensions of the magnetic members, the magnetic circuits, and the heat conductive members varied outwardly from the rotational center, a magnetic refrigerator 500 according to the embodiment shown in FIG. 10 may be obtained. That is, the radial thickness of the magnetic members is thinner from the inner periphery toward the outer periphery, all the magnetic members 10 having the same heat capacity, i.e. volume. Further, with respect to the permanent magnet and magnetic projection (not shown) constituting a magnetic circuit, similar to magnetic members, the radial thickness is thinner from the inner periphery toward the outer periphery so that all magnetic members are configured to generate the same amount of heat. Moreover, with respect to the heat conductive members 30, the radial thickness is thicker from the inner periphery toward the outer periphery so that between the magnetic members, magnetic member and the low-temperature side heat exchange unit 40A, and the magnetic member and the high-temperature side heat exchange unit 40B, heat transfer will be efficiently performed.

The principle based on which the magnetic refrigerator 500 pertaining to the present embodiment constructed above performs magnetic refrigeration is the same as that explained with reference to FIGS. 3A-3E.

As described above, according to the magnetic refrigerator pertaining to the present embodiment, the heat capacity of each magnetic member is set equal and due to reduction in heat resistance of each heat conductive member, the heat transport capacity may be increased and the refrigeration performance will be improved (compared to the conventional technique, 100% increase). Further, since the shape of the permanent magnet corresponds to the shape of each magnetic member, useless part of the permanent magnet is not present and the lightweight magnetic refrigerator may be available.

Further, since the radial thickness of the heat conductive member is made thicker as it is located on outer peripheral side, it is possible to improve the strength of the heat conductive member to thereby improve the reliability of the magnetic refrigerator.

Furthermore, since only the positive magnetic material is used which is inexpensive and has greater magnetocaloric effect compared to the negative magnetic material, it is possible to improve the refrigerating capacity and to contributes to cost reduction.

Next, the specific configuration of the magnetic refrigerator according to the third embodiment will be described with reference to FIG. 11. In the magnetic refrigerator in the third embodiment, instead of the same volume of the magnetic member as in the second embodiment, by setting the volume of the magnetic member smaller outwardly from the center of rotation, it is intended to keep the heat transfer loss smaller.

Figure 11:
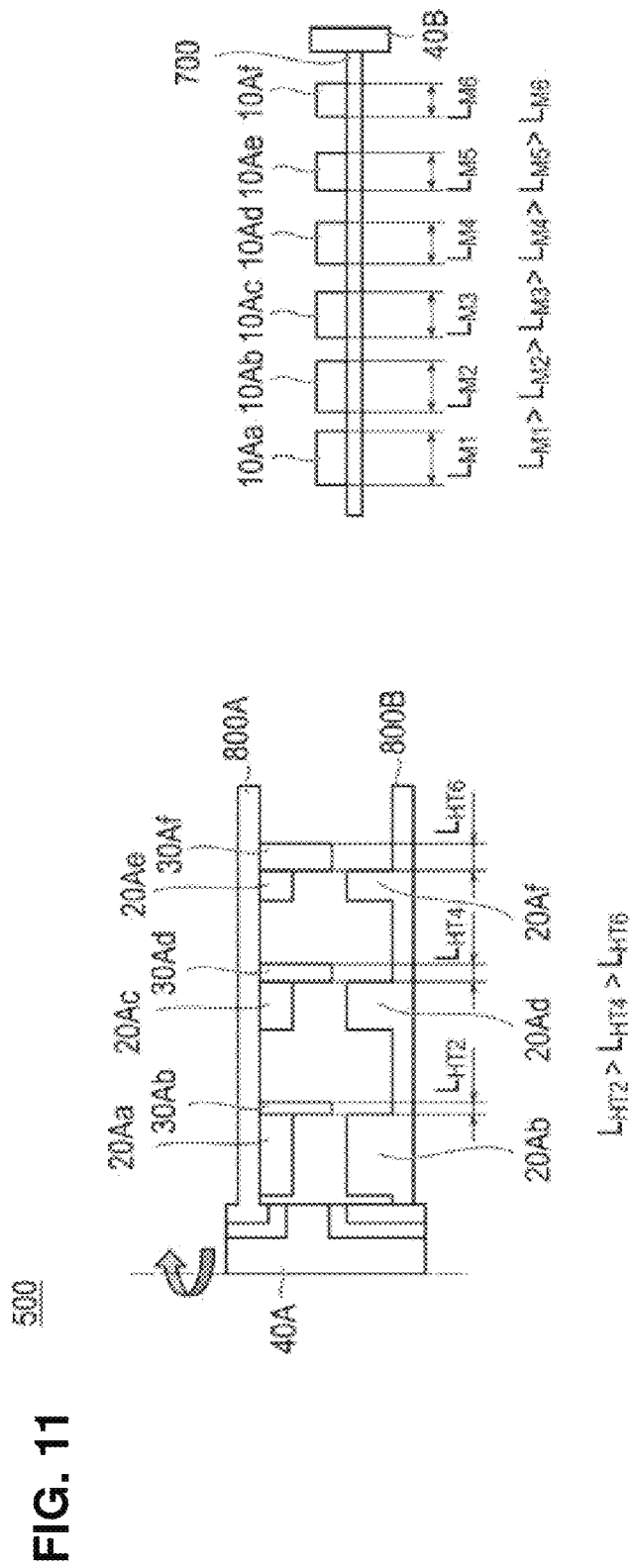
FIG. 11 is an exploded cross-sectional view of the magnetic refrigerator according to a third embodiment.

In the present embodiment, as shown in FIG. 11, in the magnetic body arranged plate 700, the volume of the magnetic members 10Aa, 10Ab, 10Ac, 10Ad, 10Ae, and 10Af is set smaller in the direction toward the outer periphery from the inner periphery of the magnetic body arranged plate 700. The reason to have the volume of magnetic members smaller in the direction from inner periphery to the outer periphery is to reduce the heat transfer loss achieved by successively making the heat capacity of the magnetic member smaller.

In order to reduce the heat transfer loss, in the present embodiment, as is shown in FIG. 11, the radial thickness LM1, LM2, LM3, LM4, LM5, and LM6 of the magnetic members 10Aa, 10Ab, 10Ac, 10Ad, 10Ae, and 10Af is set such that the following relationship may be established; LM1>LM2>LM3>LM4>LM5>LM6. And yet, the thickness of these magnetic members are further required to meet the relationship in which the heat capacity QM1, QM2, QM3, QM4, QM5, and QM6 of all magnetic members 10Aa, 10Ab, 10Ac, 10Ad, 10Ae, and 10Af are defined in the following relationship; QM1>QM2>QM3>QM4>QM5>QM6. Therefore, the radial thickness LM1, LM2, LM3, LM4, LM5, and LM6 of the magnetic members 10Aa, 10Ab, 10Ac, 10Ad, 10Ae, and 10Af according to the present embodiment is even more thinner in the radially outward direction compared to the radial thickness is, 10Aa in the second embodiment, 10Ab, 10Ac, 10Ad, 10Ae than LM1, LM2, LM3, LM4, LM5, LM6 thickness LM1, LM2, LM3, LM4, LM5, and LM6 of the magnetic members 10Aa, 10Ab, 10Ac, 10Ad, 10Ae, and 10Af in the second embodiment.

The above situation is also true for the magnetic body units 200B, 200C, . . . , 200G, . . . and 200L shown in FIG. 5B.

As shown in FIG. 11, the radial thickness of the permanent magnets 20Aa, 20Ac, and 20Ae disposed on the upper disc 800A of the magnet/heat conductive member arranged plate 800 is configured to be thinner in the direction from the inner periphery to the outer periphery, and corresponds to the radial thickness of the magnetic members 10Aa, 10Ac, and 10Ae. Further, the radial thickness of the magnetic projections 20Ab, 20Ad, and 20Af disposed on the lower disc 800B is set thinner in the direction from the inner periphery to the outer periphery, and correspond to the radial thickness of the opposing permanent magnets 20Aa, 20Ac, and 20Ae. Note that the permanent magnet and the opposing magnetic projection form part of the magnetic circuit as described above.

Further, as shown FIG. 11, FIG. 5C and FIG. 5B, the permanent magnets 20Aa, 20Ac, 20Ae are shaped in the same dimension or contour as the magnetic member 10Aa, 10Ac, and 10A. In other words, the shape and dimension of the permanent magnet 20Aa and the magnetic member 10Aa are the same in the facing direction. Also, with respect to the permanent magnet 20Aa and the magnetic member 10Ac, the permanent magnet 20Ae and the magnetic member 10, the shape and dimension in the facing direction are the same.

In addition, the radial thickness LTH2, LTH4, LTH6 of the heat conductive members 30Ab, 30Ad, and 30Af disposed on the upper disc 800A of the magnet/heat conductive member arranged plate 800 is set successively thicker from the inner periphery to the outer periphery of the disc 800A. This is intended to secure sufficient strength of the heat conductive members 30Ab, 30Ad, and 30Af. Since the speed of the disc 800A at the outer periphery side is faster than the inner periphery side, the centrifugal force exerted is greater at the outer periphery side. Therefore, the structure in which the radial thickness of the heat conductive members 30Ab, 30Ad, and 30Af is made thicker is convenient for holding the mechanical strength. Further, the circumferential length of the heat conductive members 30Ab, 30Ad, and 30Af are set progressively longer form the inner periphery of the disc 800A to the outer periphery. This arrangement is intended for reducing the heat resistance in the radial direction of the heat conductive members 30Ab, 30Ad, and 30Af. Therefore, the placement or installation interval of the magnetic members 10Aa, 10Ab, 10Ac, 10Ad, 10Ae, and 10Af is decided based on the thickness of the heat conductive members 30Ab, 30Ad, and 30Af. The shape of the heat conductive members 30Ab, 30Ad, and 30Af are adapted to the shape of the respective gap between magnetic members, i.e., 10Aa-10Ab, 10Ac-10Ad, and 10Ae-10Af.

In addition, when the radial thickness of the heat conductive members 30Ab, 30Ad, and 30Af becomes thick, thermal resistance in the radial direction of the heat conductive member increases. However, because the circumferential dimension of the magnetic members 10Aa, 10Ab, 10Ac, 10Ad, 10Ae, and 10Af is set longer toward the outer periphery from the inner periphery, the cross sectional area A of the heat conductive members 30Ab, 30Ad, and 30Af becomes large so that respective heat resistance of the heat conductive member 30Ab, 30Ad, and 30Af may be set to be substantially same.

Given the circumstances described above, in the present embodiment, as in the second embodiment, as shown in FIG. 11, the radial thickness LTH2, LTH4, LTH6 of the heat conductive members 30Ab, 30Ad, and 30Af are set such that the following relationship may be established; LTH2<LTH4<LTH6. Further, the circumferential length of the heat conductive members 30Ab, 30Ad, and 30Af is set to be successively longer so as to match the shape of respective gaps between the magnetic members; 10Aa-10Ab, 10Ac-10Ad, and 10Ae-10Af.

The principle based on which the magnetic refrigerator pertaining to the present embodiment structured above is the same as that explained above with reference to FIGS. 3A-3E.

As described above, according to the magnetic refrigerator pertaining to the present embodiment, it is possible to gradually decrease heat transfer loss since the heat capacity of each magnetic member is set to be successively smaller from the side of inner periphery toward the outer periphery.

Next, the specific configuration of the magnetic refrigerator according to the fourth embodiment will be described with reference to FIG. 12 and FIG. 13. Contrary to the magnetic refrigerator according to the second and third embodiments, the magnetic refrigerator according to the present embodiment is structured to rotate the magnetic body while fixing the magnetic circuit and the heat conductive member of the magnetic refrigerator.

Figure 12:
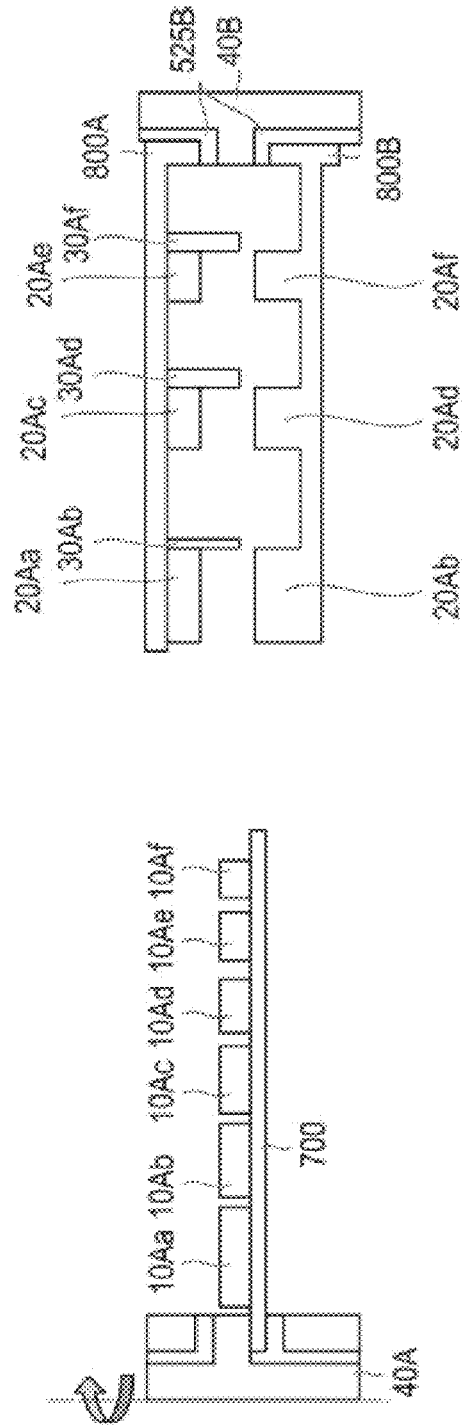
FIG. 12 is an exploded cross-sectional view of the magnetic refrigerator according to a fourth embodiment.

As shown in FIG. 12, in the present embodiment, the magnetic body arranged plate 700 is supported so as to be rotatable around the low-temperature side heat exchange unit 40A about its center portion as rotation axis. The magnetic body arranged plate 700 is rotated by the driving unit. On the other hand, the magnet/heat conductive member arranged plate 800 is fixed to the high-temperature side heat exchange unit 40B. Between the magnet/heat conductive member arranged plate 800 (800A, 800B) and the high-temperature side heat exchange unit 40B, an insulating material 535B is interposed in order to prevent transfer of heat between the magnet/heat conductive member arranged plate 800 and the high-temperature side heat exchange unit 40B. Note that the shape of the magnetic body, the magnetic circuit, the heat conductive member is the same as in the second and third embodiments.

Figure 13:
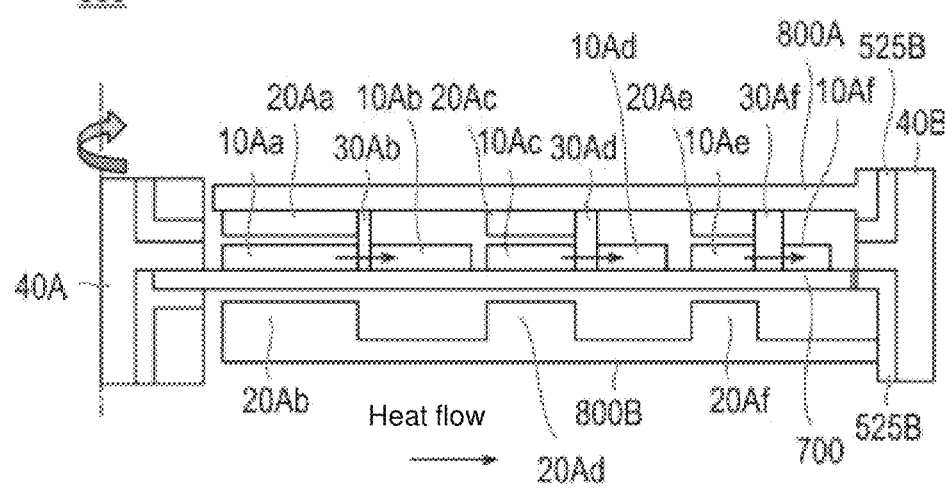
FIG. 13 is a schematic view for explaining a state in which heat moves when rotating the annular magnetic member arranged or disposed plate of the magnetic refrigerator according to the fourth embodiment.

When the magnetic bod arranged plate 700 of the magnetic refrigerator 500 structured above rotates, as shown in FIG. 13 representing a A-A cross sectional view of FIG. 8, heat transfers from the magnetic member 10Aa to the magnetic member 10Ab, from the magnetic member 10Ac to the magnetic member 10Ad, from the magnetic member 10Ae to the magnetic member 10Af, respectively through the heat conductive members 30Ab, 30Ad, and 30Af. Note that the state of heat transfer in each magnetic body unit is the same as that shown in FIG. 11.

Thus, according to the magnetic refrigerator pertaining to the present embodiment, since both the combination of the permanent magnet and the magnetic projections forming the magnetic circuit and the magnet/heat conductive member arranged plate 800 having the heat conductive member are fixed, and the magnetic body arranged plate 700 forming the magnetic body only is subject to rotation, the start-up time for the magnetic refrigerator is faster because the weight of the magnetic body arranged plate 70 is light compared to the weight of the magnet/heat conductive member arranged plate 800.

The invention claimed is:

1. A magnetic refrigerator comprising:
  a magnetic body arranged plate on which a plurality of magnetic body units are disposed, each magnetic body unit having magnetic members of a same material arranged side by side, the plurality of magnetic body units disposed side by side in a direction perpendicular to an arrangement direction of the magnetic members;
  a low-temperature side heat exchange unit adjacent to and spaced with a gap from a first end magnetic member positioned on one end of each magnetic body unit;
  a high-temperature side heat exchange unit adjacent to and spaced with a gap from a second end magnetic member positioned on another end of each magnetic body unit;
  a magnet/heat conductive member arranged plate on which magnetism applying units and heat conductive members are provided, the magnetism applying unit configured to apply magnetism separately to the magnetic members of each magnetic body unit disposed on the magnetic body arranged plate and the heat conductive members configured to conduct heat generated in each magnetic body unit from the low-temperature side heat exchange unit to the high-temperature side heat exchange unit; and
  a driving unit that drives at least one of the magnetic body arranged plate and the magnet/heat conductive member arranged plate to move relative to each other the magnetic body arranged plate and the magnet/heat conductive member arranged plate in the arrangement direction of the plurality of the magnetic body units.

2. The magnetic refrigerator as claimed in claim 1, wherein each magnetic member is formed by either a positive magnetic material that generates heat upon magnetism being applied and absorbs heat upon heat removal, or a negative magnetic material that absorbs heat upon magnetism being applied and generates heat upon heat removal.

3. The magnetic refrigerator as claimed in claim 1, wherein the magnetism applying units are configured to selectively approach or depart the magnetic members arranged on the magnetic body arranged plate to exhibit magnetocaloric effect in response to the relative movement between the magnet/heat conductive member arranged plate and the magnetic body arranged plate, and wherein the heat conductive members are configured to selectively insert or remove between the magnetic members arranged on the magnetic body arranged plate, between the low-temperature side heat exchange unit and the first end magnetic member, and between the high-temperature side heat exchange unit and the second end magnetic member in response to the relative movement between the magnet/heat conductive member arranged plate and the magnetic body arranged plate, to conduct the heat generated through magnetocaloric effect.

4. The magnetic refrigerator as claimed in claim 1, wherein the magnet/heat conductive member arranged plate is formed by two flat plates magnetically connected to each other and sandwiching the magnetic body arranged plate with a gap, and
  the magnetism applying units each have a magnetic circuit formed by the two flat plates, a permanent magnet mounted on one of the two flat plates, and a magnetic projection formed on the other of the two flat plates.

5. The magnetic refrigerator as claimed in claim 4, wherein the magnetic body arranged plate and the magnet/heat conductive member arranged plate are formed of a hollow disc with a center portion that is open;
  one of the low-temperature side heat exchange unit and the high-temperature side heat exchange unit is arranged in the center portion of the magnetic body arranged plate and the magnet/heat conductive member arranged plate and the other is disposed at an outer periphery of the magnetic body arranged plate and the magnet/heat conductive member arranged plate; and
  the driving unit is configured to rotate the magnet/heat conductive member arranged plate about the center portion as a rotation axis.

6. The magnetic refrigerator as claimed in claim 1, wherein the magnetic body arranged plate and the magnet/heat conductive member arranged plate are formed of a hollow disc with a center portion that is open;
  one of the low-temperature side heat exchange unit and the high-temperature side heat exchange unit is arranged in the center portion of the magnetic body arranged plate and the magnet/heat conductive member arranged plate and the other is disposed at an outer periphery of the magnetic body arranged plate and the magnet/heat conductive member arranged plate; and
  the driving unit is configured to rotate the magnetic body arranged plate about the center portion as a rotation axis.

7. The magnetic refrigerator as claimed in claim 5, wherein the magnetic members arranged on the magnetic body arranged plate are configured such that a volume of each of the magnetic members is equal to or successively smaller from an inner periphery to the outer periphery of the magnetic body arranged plate.

8. The magnetic refrigerator as claimed in claim 7, wherein a radial thickness of each of the magnetic members arranged on the magnetic body arranged plate is successively thinner from the inner periphery to the outer periphery of the magnetic body arranged plate.

9. The magnetic refrigerator as claimed in claim 7, wherein each permanent magnet disposed on the magnet/heat conductive member arranged plate is configured such that a radial thickness is successively thinner while a circumferential length is successively longer in a direction from the inner periphery toward the outer periphery of the magnet/heat conductive member arranged plate.

10. A magnetic refrigerator comprising:
  a magnetic body arranged plate on which a plurality of magnetic body units are disposed, each magnetic body unit having magnetic members of a same material arranged side by side, the plurality of magnetic body units disposed side by side in a direction perpendicular to an arrangement direction of the magnetic members;

a low-temperature side heat exchange unit adjacent to and spaced with a gap from a first end magnetic member positioned on one end of each magnetic body unit;

a high-temperature side heat exchange unit adjacent to and spaced with a gap from a second end magnetic member positioned on another end of each magnetic body unit;

a magnet/heat conductive member arranged plate on which magnetism applying units and heat conductive members are provided, the magnetism applying unit configured to apply magnetism separately to the magnetic members of each magnetic body unit disposed on the magnetic body arranged plate and the heat conductive members configured to conduct heat generated in each magnetic body unit from the low-temperature side heat exchange unit to the high-temperature side heat exchange unit, wherein the magnet/heat conductive member arranged plate is formed by two flat plates magnetically connected to each other and sandwiching the magnetic body arranged plate with a gap, and the magnetism applying units each have a magnetic circuit formed by the two flat plates, a permanent magnet mounted on one of the two flat plates, and a magnetic projection formed on the other of the two flat plates, wherein the radial thickness of each of the heat conductive members arranged on the magnet/heat conductive member arranged plate is successively thicker and a circumferential length is successively longer; and a driving unit that drives at least one of the magnetic body arranged plate and the magnet/heat conductive member arranged plate to move relative to each other the magnetic body arranged plate and the magnet/heat conductive member arranged plate in the arrangement direction of the plurality of the magnetic body units.

* * * * *